United States Patent
Syed et al.

(10) Patent No.: US 12,026,556 B2
(45) Date of Patent: Jul. 2, 2024

(54) NEURAL NETWORK GRAPH PARTITIONING FOR IMPROVED USE OF HARDWARE RESOURCES

(71) Applicant: QUALCOMM Incorporated, San Diego, CA (US)

(72) Inventors: Zakir Hossain Syed, San Diego, CA (US); Durk Van Veen, Santee, CA (US); Nathan Omer Kaslan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 588 days.

(21) Appl. No.: 17/334,674

(22) Filed: May 28, 2021

(65) Prior Publication Data
US 2021/0373961 A1 Dec. 2, 2021

Related U.S. Application Data

(60) Provisional application No. 63/031,434, filed on May 28, 2020.

(51) Int. Cl.
G06F 9/50 (2006.01)
G06N 3/063 (2023.01)

(52) U.S. Cl.
CPC .......... *G06F 9/5044* (2013.01); *G06F 9/5038* (2013.01); *G06F 9/5061* (2013.01); *G06N 3/063* (2013.01)

(58) Field of Classification Search
None
See application file for complete search history.

(56) References Cited

U.S. PATENT DOCUMENTS

| | | | | |
|---|---|---|---|---|
| 11,775,811 B2* | 10/2023 | Englert | .................... | G06N 3/08 706/25 |
| 2011/0088010 A1* | 4/2011 | Dangeville | ............... | G06F 8/10 717/104 |

OTHER PUBLICATIONS

Kahn A.B., "Topological Sorting of Large Networks", Scientific and Business Applications, Communications of the ACM, vol. 5, Issue 11, Nov. 1962, pp. 558-562.

* cited by examiner

*Primary Examiner* — Eric C Wai
(74) *Attorney, Agent, or Firm* — Seyfarth Shaw LLP

(57) ABSTRACT

A method for processing a neural network includes receiving a graph corresponding to an artificial neural network including multiple nodes connected by edges. The method determines a set of independent nodes of multiple nodes to be executed in a neural network. The method also determines a next node in the set of independent nodes to add to an ordered set of the multiple nodes corresponding to an order of execution via a hardware resource for processing the neural network. The next node is determined based on a common hardware resource with a first preceding node in the ordered set or a frequency of nodes in the set of independent nodes to be executed via a same hardware resource. The ordered set of the plurality of nodes is generated based on the next node. The method may be repeated until each of the nodes of the graph are included in the ordered set of the nodes.

30 Claims, 18 Drawing Sheets

NEURAL NETWORK GRAPH PARTITIONING FOR IMPROVED USE OF HARDWARE RESOURCES

CROSS-REFERENCE TO RELATED APPLICATION

The present application claims the benefit of U.S. Provisional Patent Application No. 63/031,434, filed on May 28, 2020, and titled "NEURAL NETWORK GRAPH PARTITIONING FOR IMPROVED USE OF HARDWARE RESOURCES," the disclosure of which is expressly incorporated by reference in its entirety.

FIELD OF THE DISCLOSURE

Aspects of the present disclosure generally relate to neural networks and more particularly to graph partitioning for improved utilization of hardware resources and efficient neural network processing.

BACKGROUND

Artificial neural networks may comprise interconnected groups of artificial neurons (e.g., neuron models). The artificial neural network may be a computational device or represented as a method to be performed by a computational device. Convolutional neural networks are a type of feed-forward artificial neural network. Convolutional neural networks may include collections of neurons that each have a receptive field and that collectively tile an input space. Convolutional neural networks (CNNs) such as deep convolutional neural networks (DCNs) have numerous applications. In particular, these neural network architectures are used in various technologies, such as image recognition, pattern recognition, speech recognition, autonomous driving, and other classification tasks.

Neural networks consist of operands that consume tensors and produce tensors. Neural networks can be used to solve complex problems, however, because of the network size and the number of computations that may be performed to produce the solution may be voluminous, the time for the network to complete a task may be long. Furthermore, because these tasks may be performed on mobile devices, which may have limited computational power, the computational costs of deep neural networks may be problematic.

Deep neural networks may take the form of a heterogeneous architecture. Although heterogeneous architectures may provide greater flexibility in neural network design, with such architectures, memory and power consumption may significantly increase with large overhead as compared to homogenous architectures.

To improve the speed of processing, parallel processing techniques have been applied. Heterogeneous accelerator systems have been designed with many such devices including different hardware components or cores such as central processing units (CPUs), graphics processing units (GPUs), digital signal processors (DSPs), or artificial intelligence processors (AIPs), neural processing units (NPUs) and neural signal processors (NSPs) that may be used in parallel processing of different neural network tasks or sub-tasks. Each of the different components have different capabilities and characteristics. Some heterogeneous systems may also include homogeneous subsystems (e.g., 1 GPU, 2 identical DSPs, and two identical NSPs). As such, some neural network tasks or sub-tasks may be more suited to run on a variety of the different component types. Determining which components of a heterogenous system should be used and how to effectively/efficiently divide the neural processing among such systems is challenging.

SUMMARY

In an aspect of the present disclosure, a method for processing a neural network is provided. The method includes receiving a representation of the neural network including multiple nodes connected by edges. Each of the multiple nodes is associated with one of a set of multiple types of hardware resources. Each of the multiple types of hardware resources is different than the other types of hardware resources. The method also includes determining a set of independent nodes of the plurality of nodes. Additionally, the method includes determining a next node in the set of independent nodes to add to an ordered set of the multiple nodes. The next node is associated with a first type of hardware resource for processing the neural network. The next node is determined based on a type of hardware resource or a frequency of nodes in the set of independent nodes to be executed via a same type of hardware resource. Further, the method includes generating the ordered set of the multiple nodes based on the next node. The ordered set corresponds to an order of execution for the multiple nodes.

In another aspect of the present disclosure, an apparatus for processing a neural network is provided. The apparatus includes a memory and one or more processors coupled to the memory. The processor(s) are configured to receive a representation of the neural network including multiple nodes connected by edges. Each of the multiple nodes is associated with one of a set of multiple types of hardware resources. Each of the multiple types of hardware resources is different than other types of hardware resources. The processor(s) are also configured to determining a set of independent nodes of the plurality of nodes. In addition, the processor(s) are configured to determine a next node in the set of independent nodes to add to an ordered set of the multiple nodes. The next node is associated with a first type of hardware resource for processing the neural network. The next node is determined based on a type of hardware resource or a frequency of nodes in the set of independent nodes to be executed via a same type of hardware resource. Further, the processor(s) are configured to generate the ordered set of the plurality of nodes based on the next node. The ordered set corresponding to an order of execution for the multiple nodes.

In yet another aspect of the present disclosure, an apparatus for processing a neural network is provided. The apparatus includes means for receiving a representation of the neural network including multiple nodes connected by edges. Each of the multiple nodes is associated with one of a set of multiple types of hardware resources. Each of the multiple types of hardware resources is different than other types of hardware resources. The apparatus also includes means for determining a set of independent nodes of the plurality of nodes. Additionally, the apparatus includes means for determining a next node in the set of independent nodes to add to an ordered set of the multiple nodes. The next node is associated with a first type of hardware resource for processing the neural network. The next node is determined based on a type of hardware resource or a frequency of nodes in the set of independent nodes to be executed via a same type of hardware resource. Further, the apparatus includes means for generating the ordered set of the plurality of nodes based on the next node. The ordered set corresponding to an order of execution for the multiple nodes.

In a further aspect of the present disclosure, a non-transitory computer readable medium is provided. The computer readable medium has encoded thereon program code for processing a neural network. The program code is executed by a processor and includes code to receive a representation of the neural network including multiple nodes connected by edges. Each of the multiple nodes is associated with one of a set of multiple types of hardware resources. Each of the multiple types of hardware resources is different than other types of hardware resources. The program code also includes code to determine a set of independent nodes of the plurality of nodes. The program code, additionally, includes code to determine a next node in the set of independent nodes to add to an ordered set of the plurality of nodes. The next node is associated with a first type of hardware resource for processing the neural network. The next node is determined based on a type of hardware resource or a frequency of nodes in the set of independent nodes to be executed via a same type of hardware resource. Further, the program code includes code to generating the ordered set of the plurality of nodes based on the next node. The ordered set corresponding to an order of execution for the multiple nodes.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
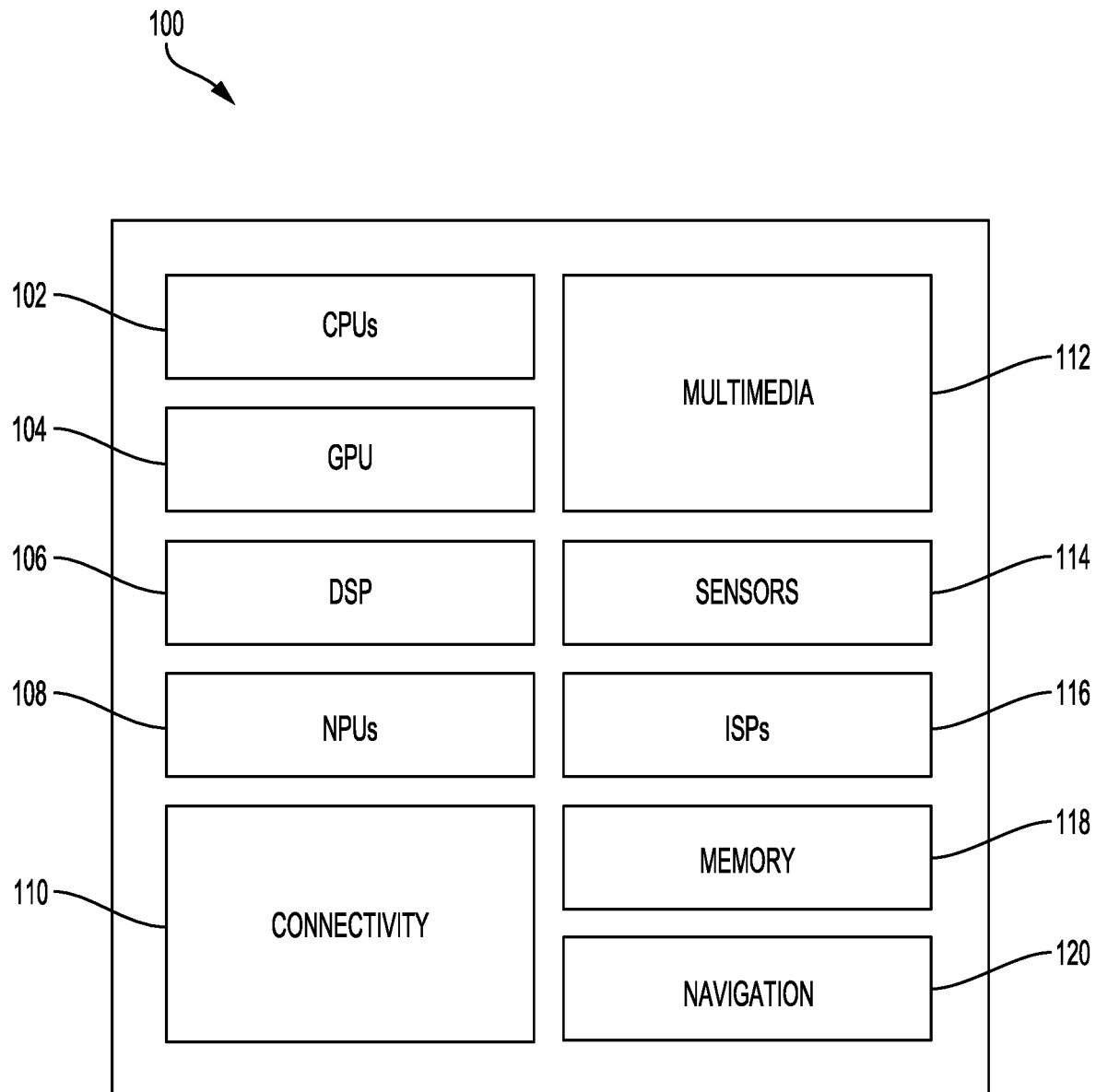
FIG. 1 illustrates an example implementation of designing a neural network using a system-on-a-chip (SOC), including a general-purpose processor, in accordance with certain aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used to mean "serving as an example, instance, or illustration." Any aspect described as "exemplary" is not necessarily to be construed as preferred or advantageous over other aspects.

Although particular aspects are described, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Deep neural networks may be used in many real-world settings as the standard process for computer vision, translation, voice recognition, ranking, and many other practical use cases. Because of this success, the efficiency of neural networks has become an area of greater focus. More efficient neural networks may reduce cloud infrastructure costs and enable operation of neural networks on devices such as smartphones, Internet of things applications, and dedicated low-power hardware.

Deep neural networks may be processed using of heterogeneous architecture such as heterogeneous accelerator systems including many different hardware components or cores such as central processing units (CPUs), graphics processing units (GPUs), digital signal processors (DSPs), or artificial intelligence processors (AIPs), neural processing units (NPUs) and neural signal processors (NSPs). The components may be used in parallel processing of different neural network tasks or sub-tasks. Although heterogeneous architectures may provide greater flexibility in neural network design, such architectures memory and power consumption may significant increase with large overhead as compared to homogenous architectures.

To improve the speed of processing in heterogeneous architectures, parallel processing techniques and network partitioning have been applied. Conventional networks partitioning algorithms traverse the neural network layers in a sequential fashion in increasing order of layer IDs. These conventional network partitioning techniques draw a partition whenever the runtime (e.g., a hardware accelerator or core device) changes. Unfortunately, conventional approaches lead to highly inefficient partitioning for certain network topologies, causing the network to ping-pong between runtimes (e.g., hardware blocks). Additionally because conventional network partitioning creates more subnets, the overall model inference time increases considerably due to the overhead of switching between cores/accelerators (e.g., CPUs, GPUs, DSPs, NPUs or NSPs).

A neural network may be represented as a directed acyclic graph. A directed acyclic graph (DAG) is a finite directed graph with no direct cycles. A DAG may include many vertices or nodes and edges or arcs. DAGs may represent neural networks such that the nodes of the graph may correspond to layers of the neural network. Each of the nodes being associated with a runtime or hardware resource. For heterogeneous architectures, multiple types of nodes and edges may be included in the graph.

Conventional approaches attempt to partition according to a constraint-based approach. For example one constraint-based approach may apply a constraint in which sub-graphs (may also be referred to as sub-networks) are directed to the same runtime or hardware resource. Multiple constraints may also be applied, for example to restrict the sub-graphs to be independent (e.g., a sub-graph may not depend on the network output), restrict the sub-graphs to be acyclic (e.g., a valid execution order), or restrict partitioning unless it results in an improved network processing. However, such conventional approaches are forced to evaluate all possible partitioning options, thus producing a partitioning process that is np-hard (non-deterministic polynomial-time hard).

To address these and other issues, aspects of the present disclosure are directed to neural network graph partitioning for more efficient use of hardware resources and some aspects are directed to improved or even optimal use of such hardware resources. In accordance with aspects of the present disclosure, a linear process is disclosed for determining an order for processing of nodes in each layer of a neural network (e.g., a deep neural network). Additionally, by partitioning the network to have fewer subnets, the execution is tighter with each runtime/accelerator getting a larger chunk of layers to execute in a more efficient manner.

In some aspects, a higher order optimization process may additionally be performed. In one example, the order of processing nodes may further be determined using a depth first search (DFS). In some aspects, the DFS may be applied from the perspective of the output of the layer to determine the order of processing nodes in each layer. Additionally, in some aspects, the process may be further enhanced by caching the results of the DFS. This may enable the elimination of redundant searches, for instance.

In some aspects, the determined order processing may be further improved by determining whether certain nodes may be hopped in the order of processing nodes. For instance, an iterative DFS may be performed to determine if a path exists between two subnets to determine whether or not a hop in the order of processing nodes is possible. The order of processing nodes may then be further updated by performing a DFS to determine if one or more nodes may be merged into a subgroup.

FIG. 1 illustrates an example implementation of a system-on-a-chip (SOC) 100, which may include a central processing unit (CPU) 102 or a multi-core CPU configured to perform graph partitioning for improved utilization of hardware resources in processing the neural network in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the CPU 102 may comprise code to receive a representation of the neural network including multiple nodes connected by edges. Each of the multiple nodes is associated with one of a set of multiple types of hardware resources. Each of the multiple types of hardware resources is different than other types of hardware resources. The instructions loaded into the CPU 102 may also comprise code to determine a set of independent nodes of a set of nodes. The instructions loaded into the CPU 102 may also comprise code to determine a next node in the set of independent nodes to add to an ordered set of the multiple nodes. The next node is associated with a first type of hardware resource for processing the neural network. The next node is determined based on a type of hardware resource or a frequency of nodes in the set of independent nodes to be executed via a same type of hardware resource. The instructions loaded into the CPU 102 may further comprise code to generate the ordered set of the plurality of nodes based on the next node. The ordered set corresponding to an order of execution for the multiple nodes.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
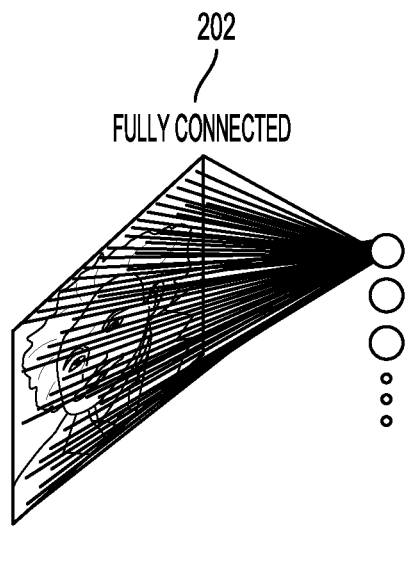
FIGS. 2A, 2B, and 2C are diagrams illustrating a neural network in accordance with aspects of the present disclosure.
Figure 2B:
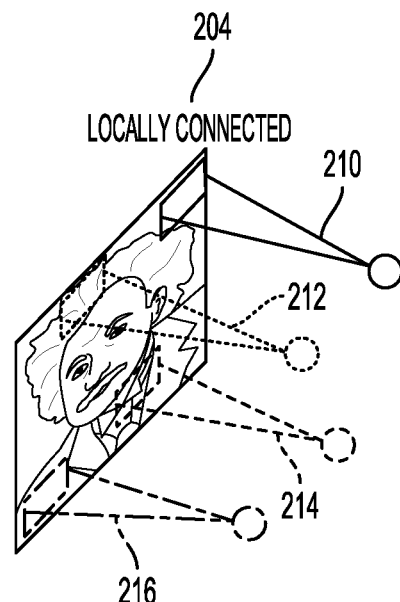

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
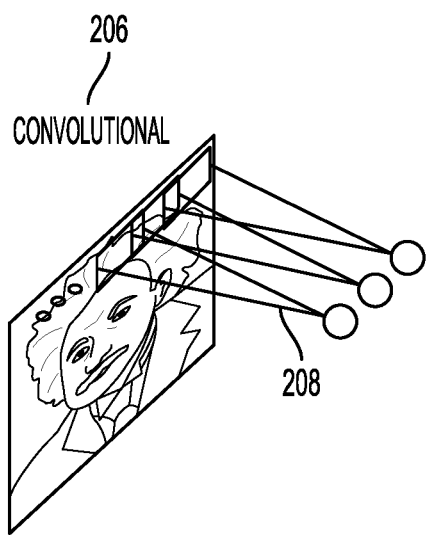

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
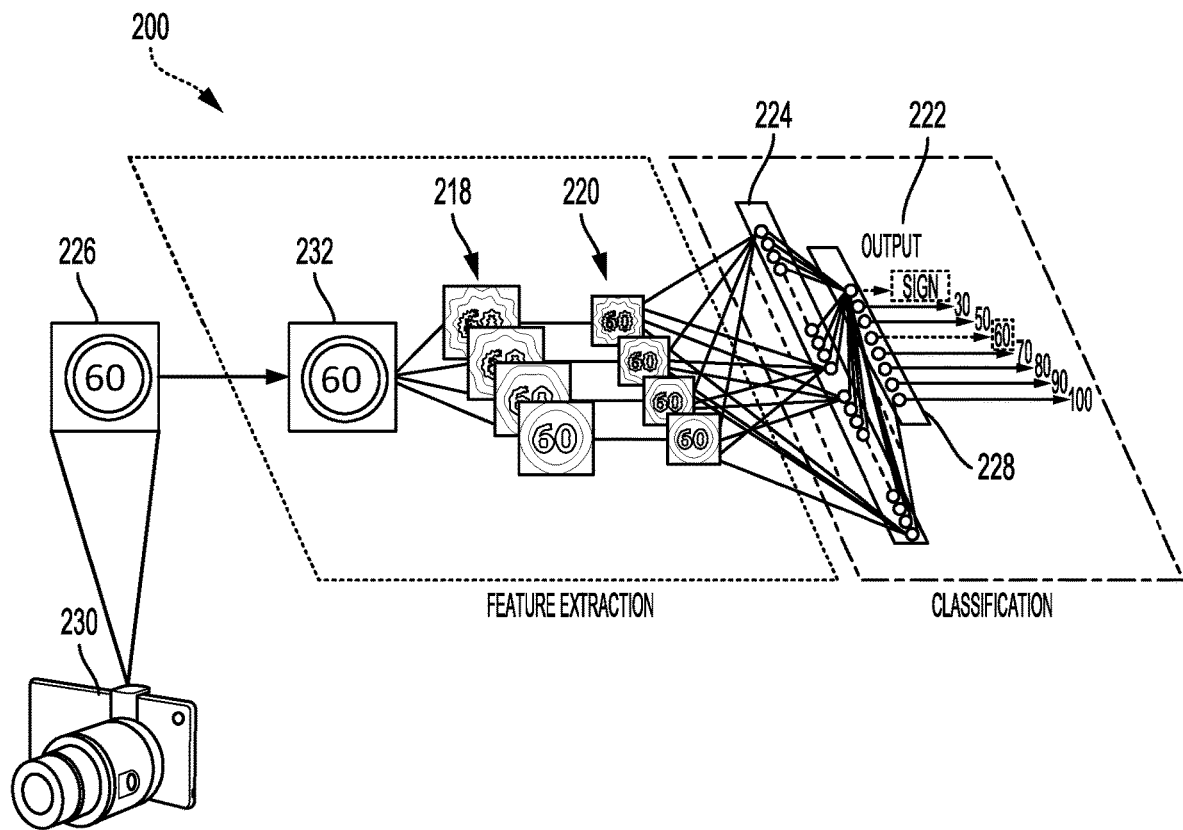
FIG. 2D is a diagram illustrating an exemplary deep convolutional network (DCN), in accordance with aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 226) and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, $\max(0,x)$. Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3:
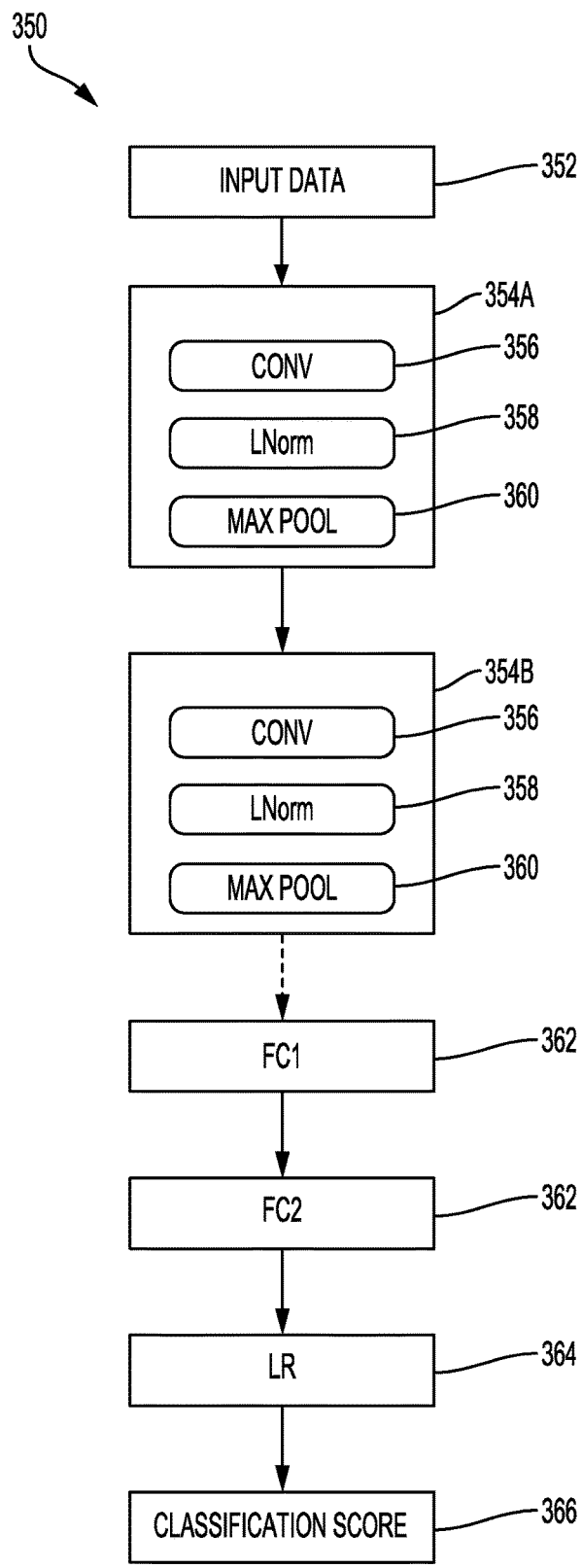
FIG. 3 is a block diagram illustrating an exemplary deep convolutional network (DCN), in accordance with aspects of the present disclosure.

FIG. 3 is a block diagram illustrating a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data to generate a feature map. Although only two of the convolution blocks 354A, 354B are shown, the present disclosure is not so limiting, and instead, any number of the convolution blocks 354A, 354B may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative embodiments, the parallel filter banks may be loaded on the DSP 106 or an ISP 116 of an SOC 100. In addition, the deep convolutional network 350 may access other processing blocks that may be present on the SOC 100, such as sensor processor 114 and navigation module 120, dedicated, respectively, to sensors and navigation.

The deep convolutional network 350 may also include one or more fully connected layers 362 (FC1 and FC2). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

Figure 4:
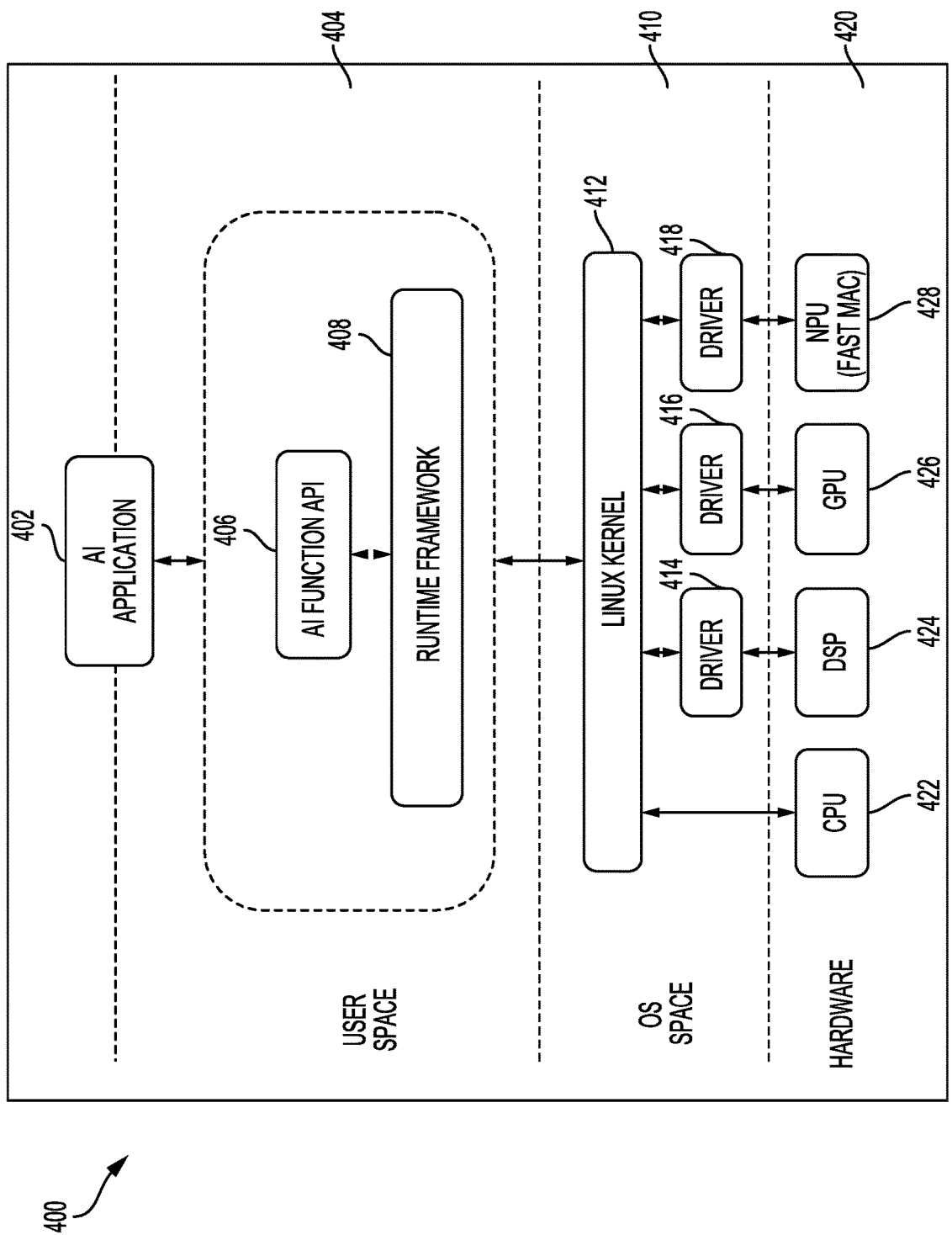
FIG. 4 is a block diagram illustrating an exemplary software architecture that may modularize artificial intelligence (AI) functions, in accordance with aspects of the present disclosure.

FIG. 4 is a block diagram illustrating an exemplary software architecture 400 that may modularize artificial intelligence (AI) functions. Using the architecture, applications may be designed that may cause various processing blocks of an SOC 420 (for example a CPU 422, a DSP 424, a GPU 426 and/or an NPU 428) to support adaptive rounding as disclosed for post-training quantization for an AI application 402, according to aspects of the present disclosure.

The AI application 402 may be configured to call functions defined in a user space 404 that may, for example, provide for the detection and recognition of a scene indicative of the location in which the device currently operates. The AI application 402 may, for example, configure a microphone and a camera differently depending on whether the recognized scene is an office, a lecture hall, a restaurant, or an outdoor setting such as a lake. The AI application 402 may make a request to compiled program code associated with a library defined in an AI function application programming interface (API) 406. This request may ultimately rely on the output of a deep neural network configured to provide an inference response based on video and positioning data, for example.

A run-time engine 408, which may be compiled code of a runtime framework, may be further accessible to the AI application 402. The AI application 402 may cause the run-time engine, for example, to request an inference at a particular time interval or triggered by an event detected by the user interface of the application. When caused to provide an inference response, the run-time engine may in turn send a signal to an operating system in an operating system (OS) space 410, such as a Linux Kernel 412, running on the SOC 420. The operating system, in turn, may cause a continuous relaxation of quantization to be performed on the CPU 422, the DSP 424, the GPU 426, the NPU 428, or some combination thereof. The CPU 422 may be accessed directly by the operating system, and other processing blocks may be accessed through a driver, such as a driver 414, 416, or 418 for, respectively, the DSP 424, the GPU 426, or the NPU 428. In the exemplary example, the deep neural network may be configured to run on a combination of processing blocks, such as the CPU 422, the DSP 424, and the GPU 426, or may be run on the NPU 428.

The application 402 (e.g., an AI application) may be configured to call functions defined in a user space 404 that may, for example, provide for the detection and recognition of a scene indicative of the location in which the device currently operates. The application 402 may, for example, configure a microphone and a camera differently depending on whether the recognized scene is an office, a lecture hall, a restaurant, or an outdoor setting such as a lake. The application 402 may make a request to compiled program code associated with a library defined in a SceneDetect application programming interface (API) 406 to provide an estimate of the current scene. This request may ultimately rely on the output of a differential neural network configured to provide scene estimates based on video and positioning data, for example.

A run-time engine 408, which may be compiled code of a Runtime Framework, may be further accessible to the application 402. The application 402 may cause the run-time engine, for example, to request a scene estimate at a particular time interval or triggered by an event detected by the user interface of the application. When caused to estimate the scene, the run-time engine may in turn send a signal to an operating system 410, such as a Linux Kernel 412, running on the SOC 420. The operating system 410, in turn, may cause a computation to be performed on the CPU 422, the DSP 424, the GPU 426, the NPU 428, or some combination thereof. The CPU 422 may be accessed directly by the operating system, and other processing blocks may be accessed through a driver, such as a driver 414-418 for a DSP 424, for a GPU 426, or for an NPU 428. In the exemplary example, the differential neural network may be configured to run on a combination of processing blocks, such as a CPU 422 and a GPU 426, or may be run on an NPU 428, if present.

In one aspect, the receiving means, the determining an independent set means, determining next node means and/or the generating means may be the CPU 102, program memory associated with the CPU 102, the dedicated memory block 118, fully connected layers 362, and or the routing connection processing unit 216 configured to perform the functions recited. In another configuration, the aforementioned means may be any module or any apparatus configured to perform the functions recited by the aforementioned means.

According to certain aspects of the present disclosure, each of the fully connected layers 362 may be configured to determine parameters of the model based upon desired one or more functional features of the model, and develop the one or more functional features towards the desired functional features as the determined parameters are further adapted, tuned and updated.

Aspects of the present disclosure are directed to partitioning a neural network graph for improved, and in some aspects, optimal use of hardware resources.

FIGS. 5A-5F are diagrams illustrating an example process for partitioning a graph 500, in accordance with aspects of the present disclosure. Referring to FIGS. 5A-5F, the graph 500 may be a direct acyclic graph and may correspond to a deep neural network (e.g., deep convolutional network 350). As shown in FIGS. 5A-5F, the graph 500 includes multiple nodes (A-T) which are coupled together with edges. Each of the nodes may, for example, correspond to layers of a deep neural network. Additionally, as shown in FIGS. 5A-5F, each of the nodes (A-T) has a shading pattern that corresponds to a hardware resource or runtime (e.g., CPU, GPU, DSP, NPU, or NSP), for example. That is, different shading may represent a different type of hardware resource. Although, the nodes shown in FIGS. 5A-5F include four shading patterns, the present disclosure is not so limiting and additional hardware resources may be reflected with different shading patterns. In one example, the shading patterns may include a first shading pattern (nodes A, J, K, L, T), a second shading pattern (nodes B, D, F), a third shading pattern (C, E, G, M, O), and a fourth shading pattern (nodes H, I, N, P, Q, R, S).

Figure 5A:
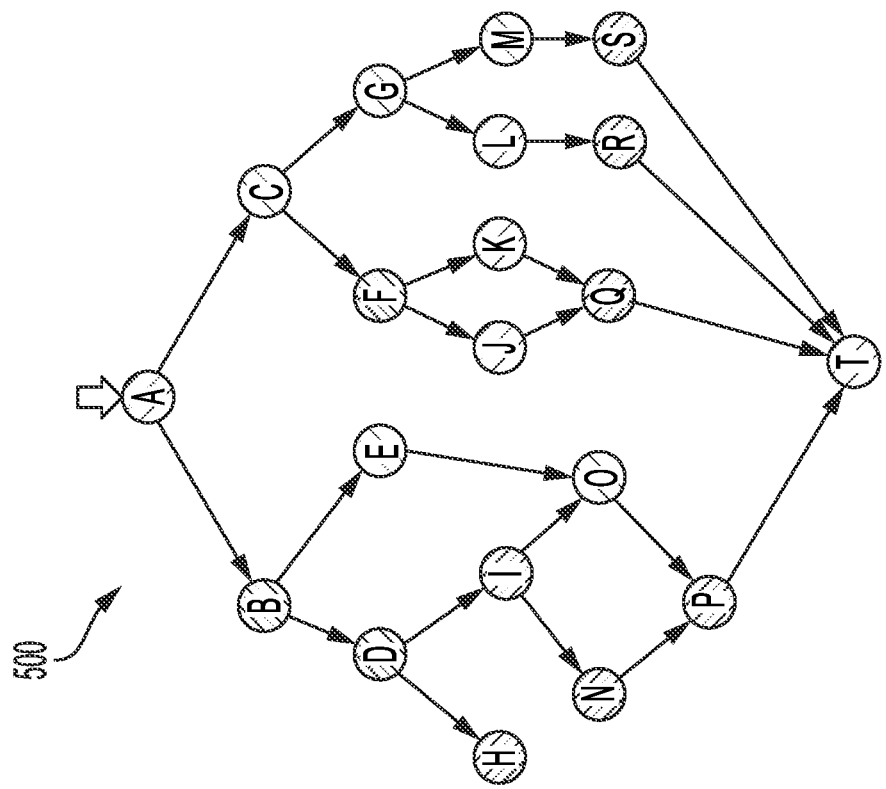
FIGS. 5A-5F are diagrams illustrating an example process for partitioning a graph, in accordance with aspects of the present disclosure.
Figure 5A:
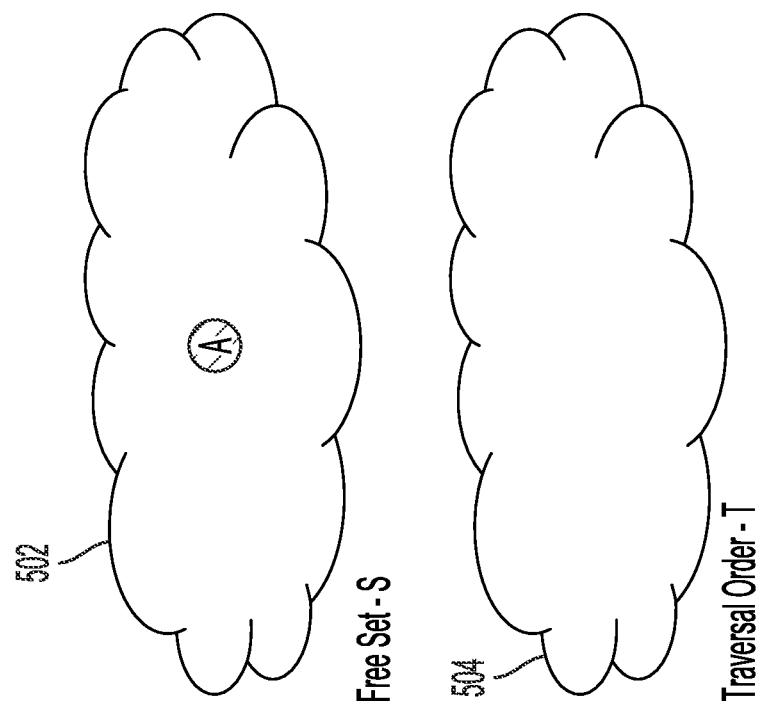

Referring to FIG. 5A, a linear process may start by identifying one or more nodes to add to a free set 502. The free set 502 is a set of independent nodes. In accordance with aspects of the present disclosure, nodes may be added be added to the free set 502 if the node has no incoming connections. In the example of FIG. 5A, node A is added to the free set 502 because node A has no incoming edges or connections. Nodes in the free set 502 may be selected for addition to a traversal order set 504.

Figure 5B:
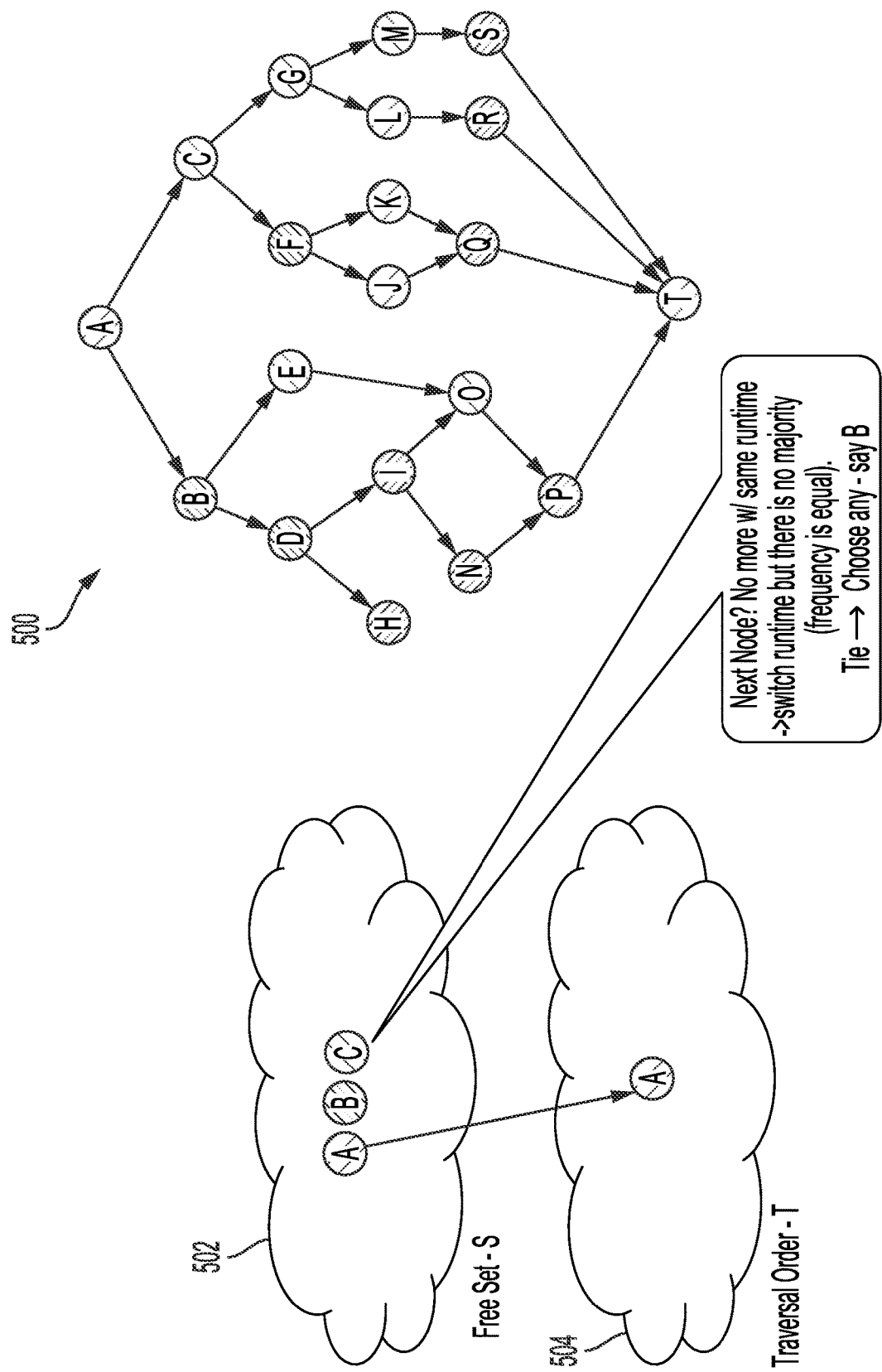

Because node A is the only node in the free set 502, Node A may be added to the traversal order set 504, as shown in FIG. 5B. After node A is added to the traversal order set 504, the process may evaluate the graph as if the node A had been removed and may identify nodes to add to the free set 502. Because nodes B and C, have no incoming conditions (with node A already in the traversal order set 504), nodes B and node C are added to the free set 502.

Figure 5C:
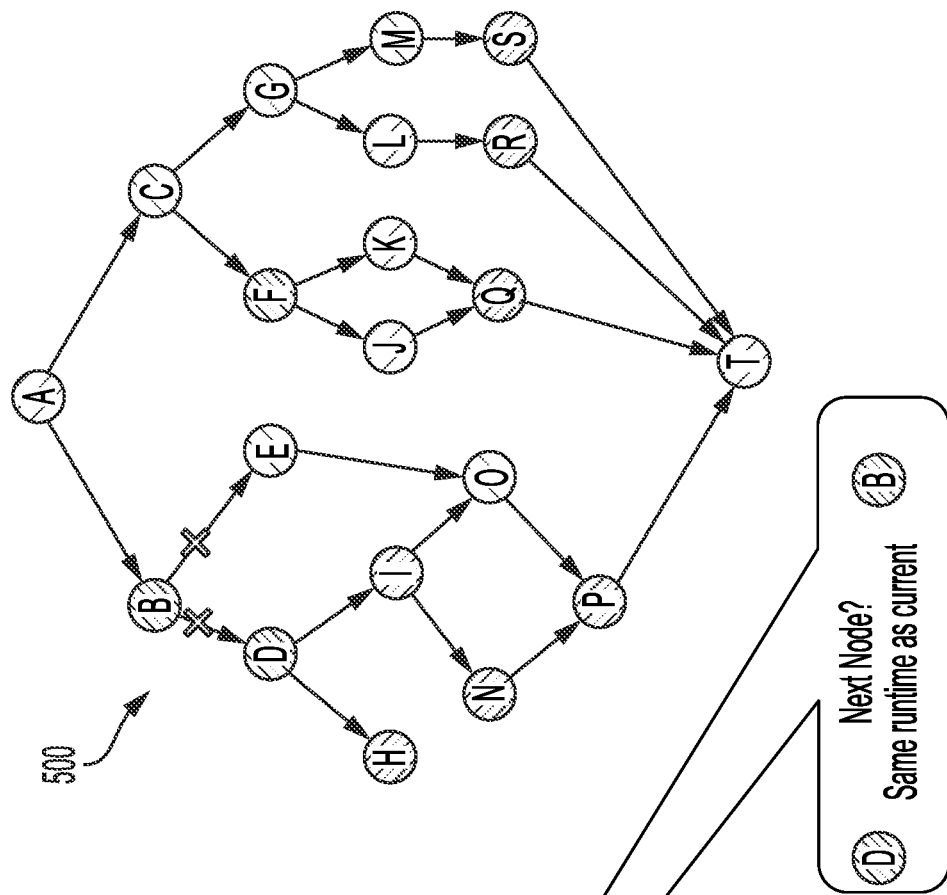
Figure 5C:
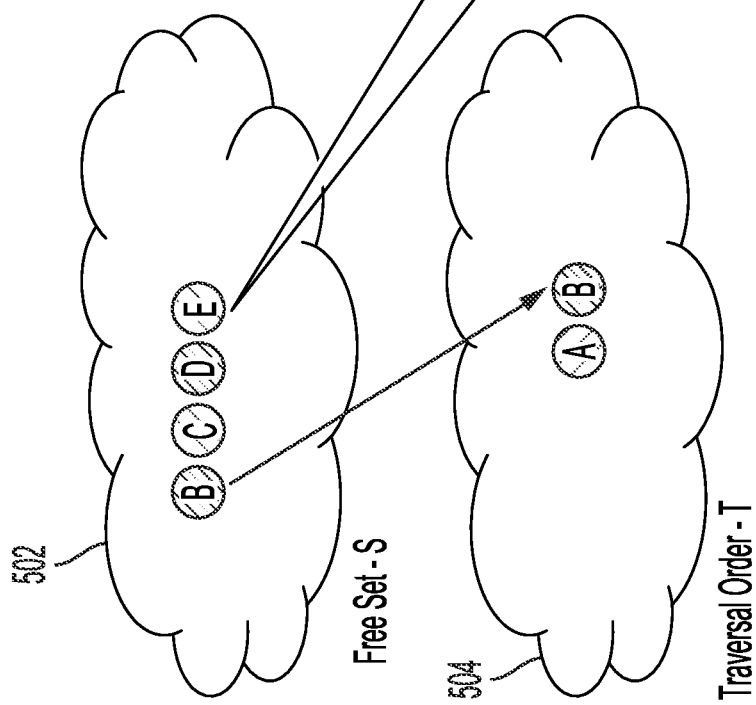
Figure 5D:
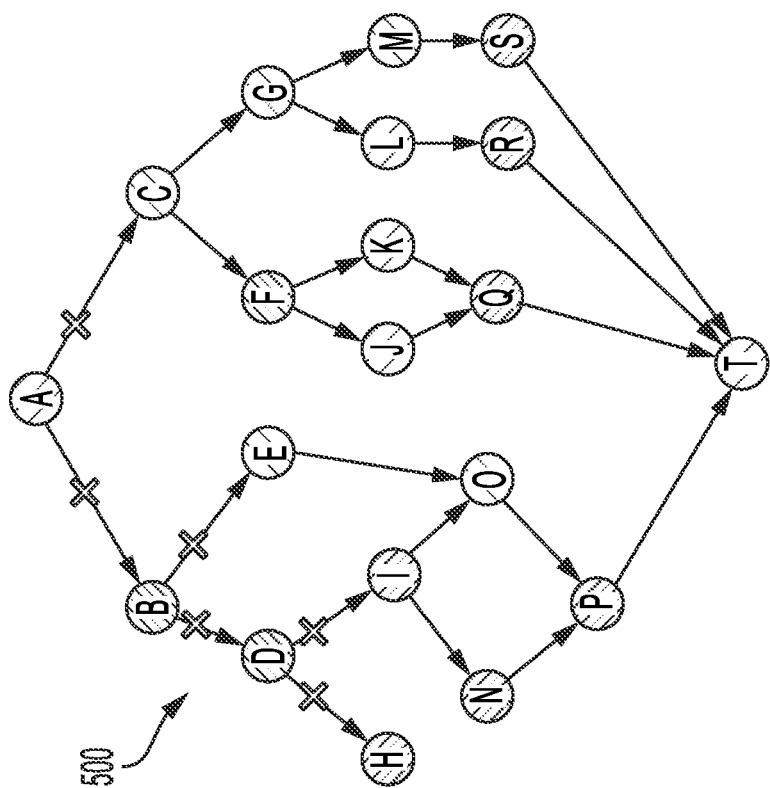
Figure 5D:
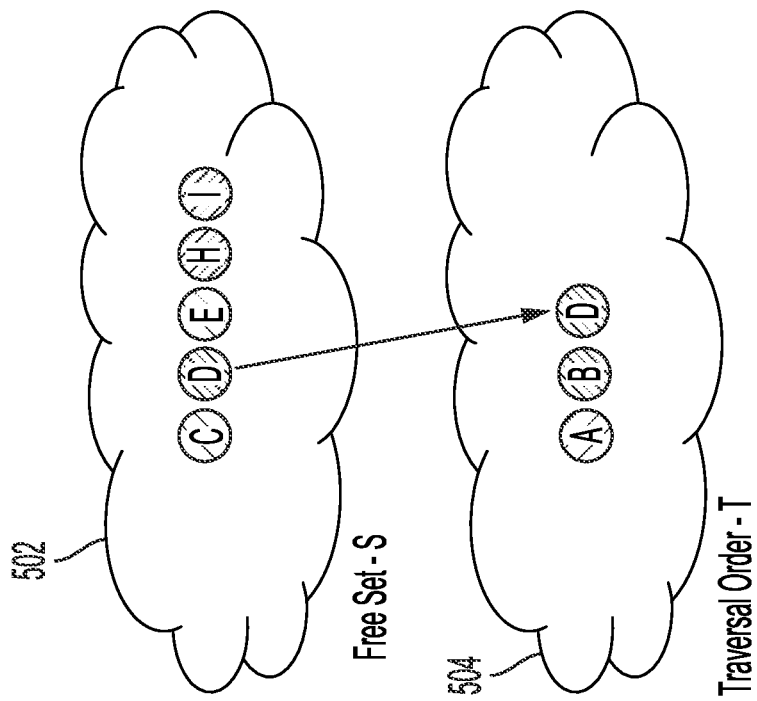

In some aspects, a next node may be selected for addition to the traversal order set 504 if it has the same runtime or is processed on the same hardware resource (e.g., CPU, GPU, DSP, NPU, or NSP) as may be indicated with the same shading. In this example, neither node B nor node C has the same runtime/hardware resource (e.g., shown be different shading than node A). In this case, either of node B or node C may be selected for addition to the traversal order set 504. As shown in FIG. 5C, having added node B to the traversal order set 504, the example process may identify further nodes to add to the free set 502 (as if nodes A and B were not in the graph because both nodes A and B are included in the traversal order set 504). Accordingly, nodes D and E are added to the free set 502. Then, as shown in FIG. 5D, because node D has the same runtime/hardware resource (e.g. indicated by the same shading pattern), node D is added to the traversal order set 504 following node B. Having added node D to the traversal order set 504, still further nodes for the free set 502 may be identified. Accordingly, nodes H and I are added to the free set 502.

Figure 5E:
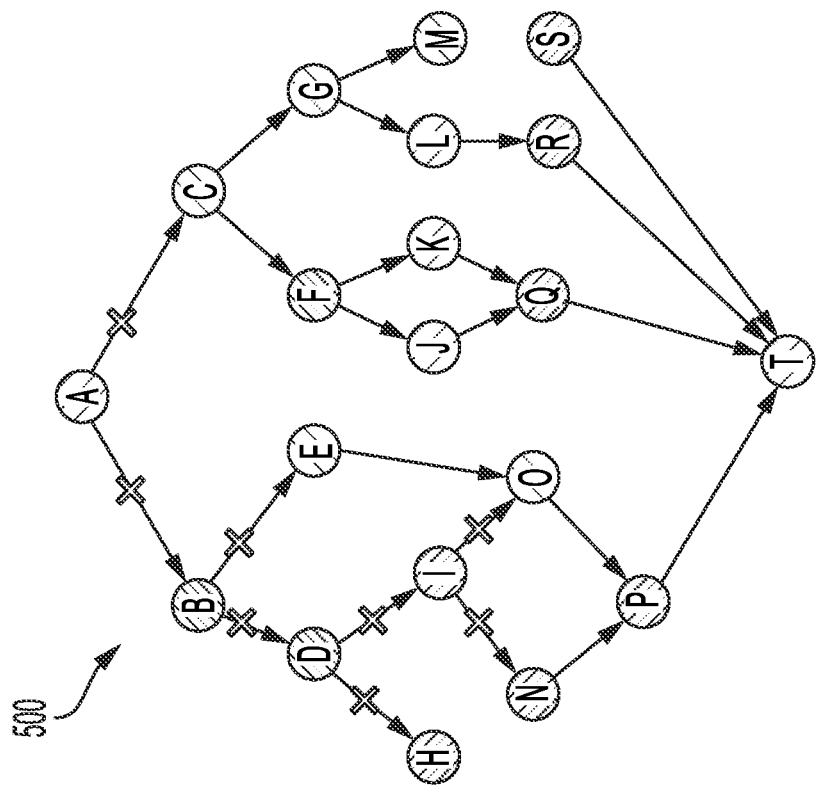
Figure 5E:
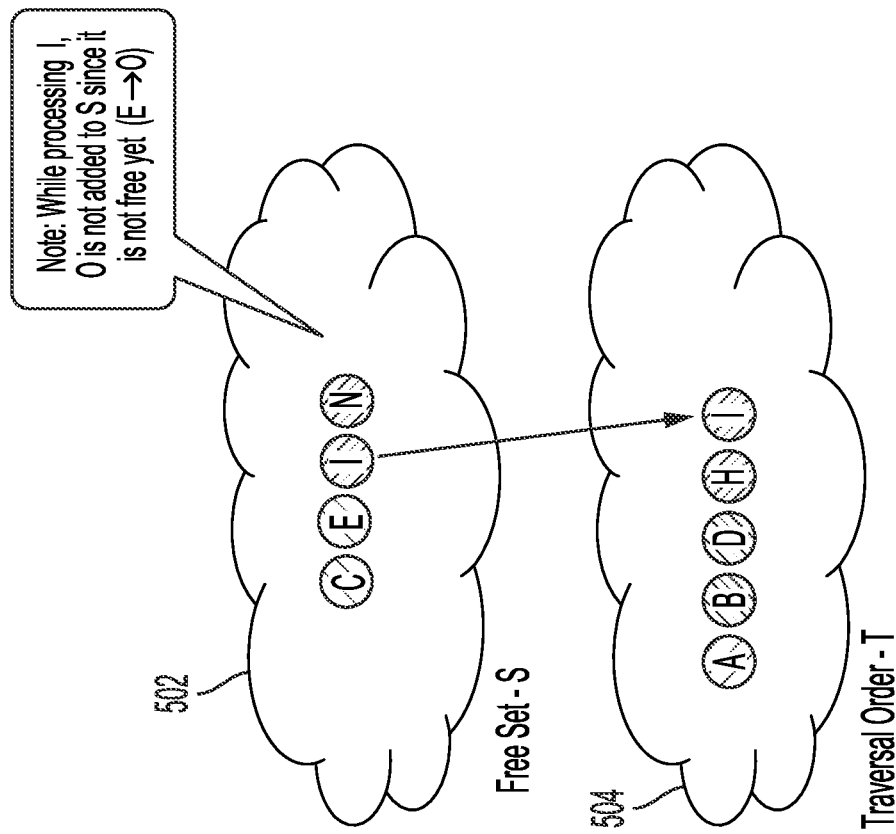

Continuing with the example of FIG. 5E, nodes H and I have been added to the traversal order set 504. However, it is noted that because none of the nodes in the free set 502 have the same runtime/hardware resource as the prior node (e.g., node D) added to the traversal order set 504, any of nodes C, E, H, or I could have been selected. In some aspects, the next node may be selected by a number of nodes having the same runtime/hardware resource in the graph 500. For instance, in graph 500, there are more nodes in the graph having the same runtime/hardware resource as nodes H and I, so either of nodes H or I may be selected as the next node.

Because there are no subsequent connections from node H (e.g., no child connection), no further nodes are added to the free set 502 in this iteration. Node I may be added to the traversal order set 504, because node I also has the same runtime/hardware resource as node H. Then as shown in FIG. 5E, node N has been identified as having no incoming nodes (again as if the nodes included in the traversal order set 504 are removed) and may be added to the free set 502. However, node O has an incoming connection from node E, which is not included in the traversal order set 504. Thus, node O is not added to the free set 502 in the same iteration as node N. As described, a next node may be selected for addition to the traversal order set 504 if the node being considered has the same runtime/hardware resource. As shown in FIG. 5E, nodes I and N both have the same runtime/hardware resource as the prior node (e.g., node H) in the traversal order set 504.

Figure 5F:
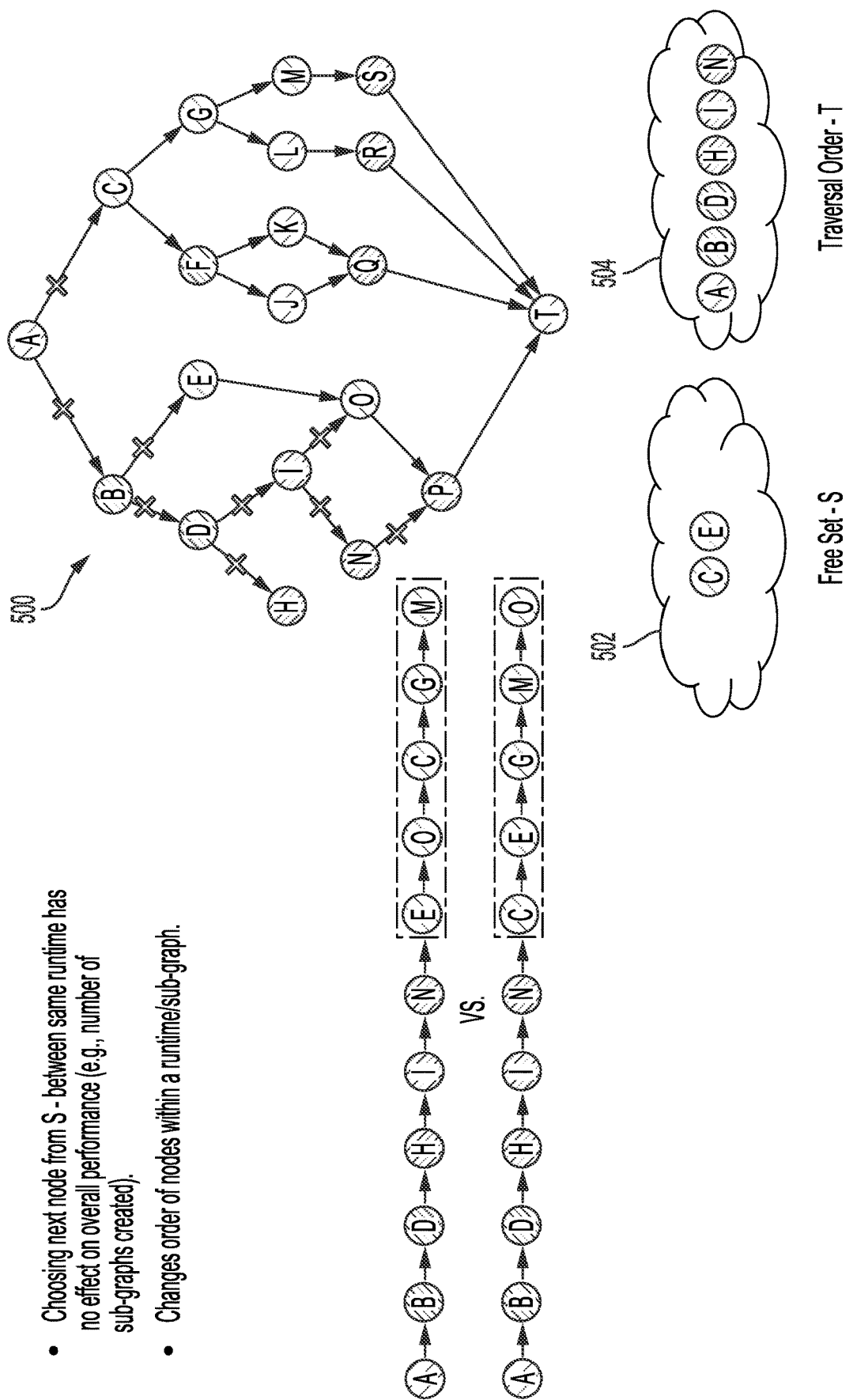

As shown in FIG. 5F, node N is added to the traversal order set 504, because it has the same runtime/hardware resource as the prior node (e.g., node I) added to the traversal order set 504. With nodes C and E remaining in the free set 502, selecting a next node from the free set 502 may not further reduce the number of sub-graphs (e.g., network partitions) created. As such, either of nodes C and E may be selected for addition to the traversal order set 504. Thereafter, the process may continue in similar fashion until all nodes have been added to the traversal order set 504.

Figure 6A:
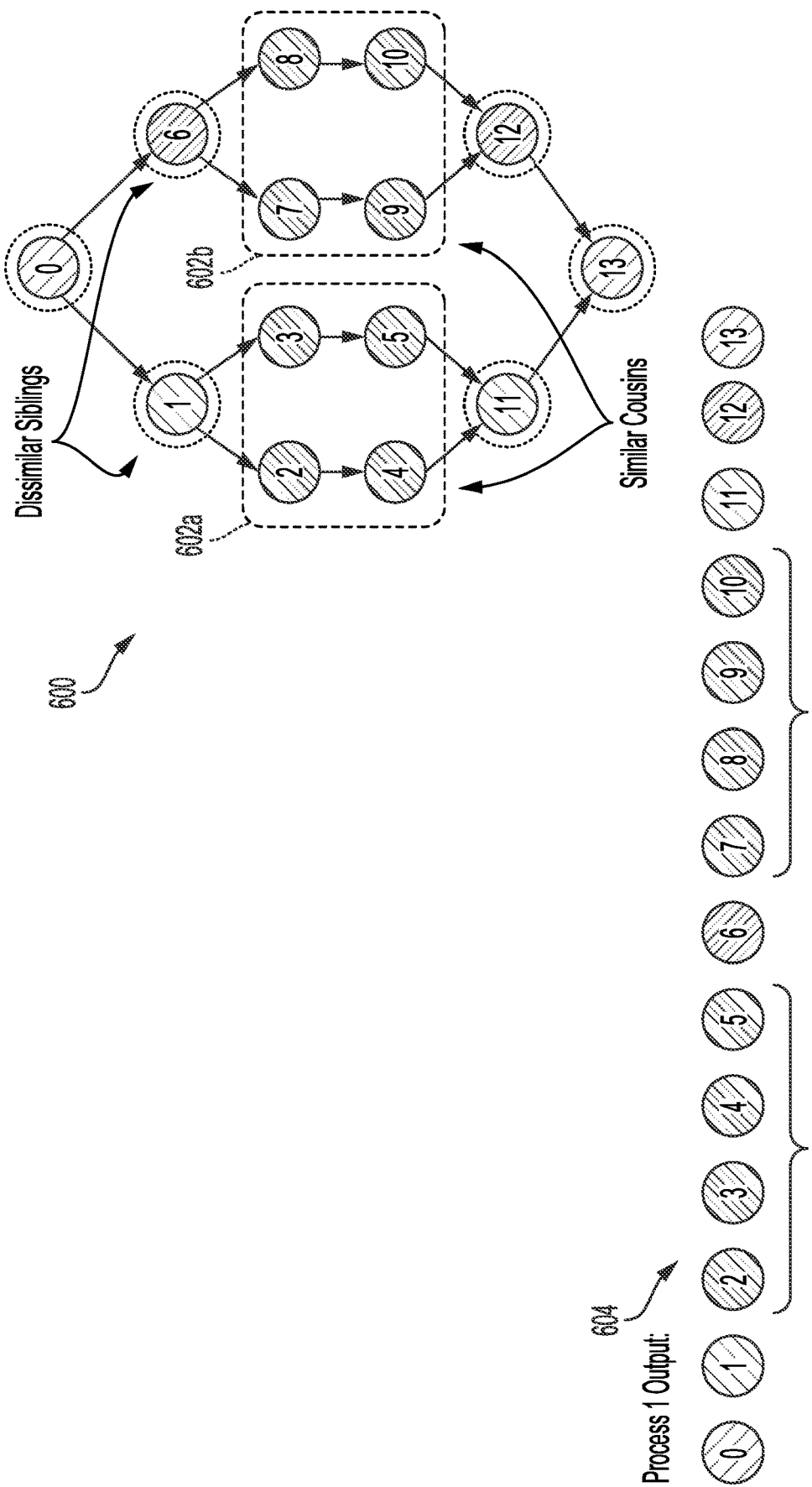
FIGS. 6A-6E are diagrams illustrating an example process for further partitioning a graph, in accordance with aspects of the present disclosure.

FIGS. 6A-6E are diagrams illustrating example processes for further partitioning graphs 600, 650, and 670, in accordance with aspects of the present disclosure. As shown in FIGS. 6A-6E, a higher order optimization processes may additionally be performed relative to the example process described with reference to FIGS. 5A-F. Referring to FIG. 6A, the graph 600 includes a pair of similar (e.g., having the same runtime/hardware resources) cousin nodes included sub-graphs 602a and 602b, each having different dependencies (e.g., incoming connections). Cousin nodes share a grandparent node (e.g., node 0). The graph 600 also has a pair of dissimilar (e.g., having different runtime/hardware resources) siblings node 1 and node 6. Sibling nodes share a parent node (e.g., node 0). The nodes of the graph 600 are shown in sub-graphs formed, for example, using a process similar to that described with reference to FIGS. 5A-F. For instance, sub-graph 0 includes node 0, sub-graph 1 includes node 1, and sub-graph 5 includes node 5, and similar cousins 602a and 602b are included in sub-graphs 2 and sub-graph 4, respectively. Each of the sub-graphs are shown in the traversal order output 604. The traversal order output 604 includes the nodes of the similar cousin nodes 602a and 602b separated by a single node (node 6).

Figure 6B:
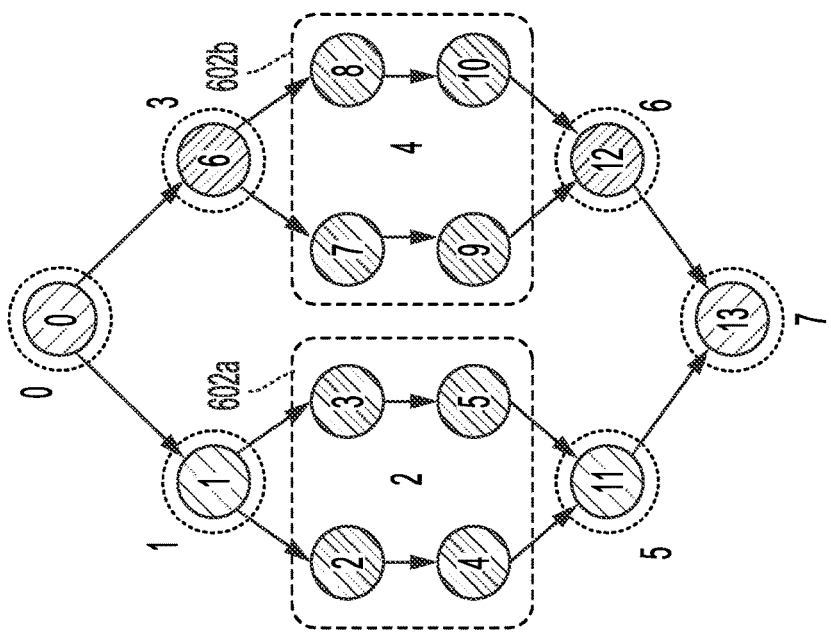
Figure 6B:
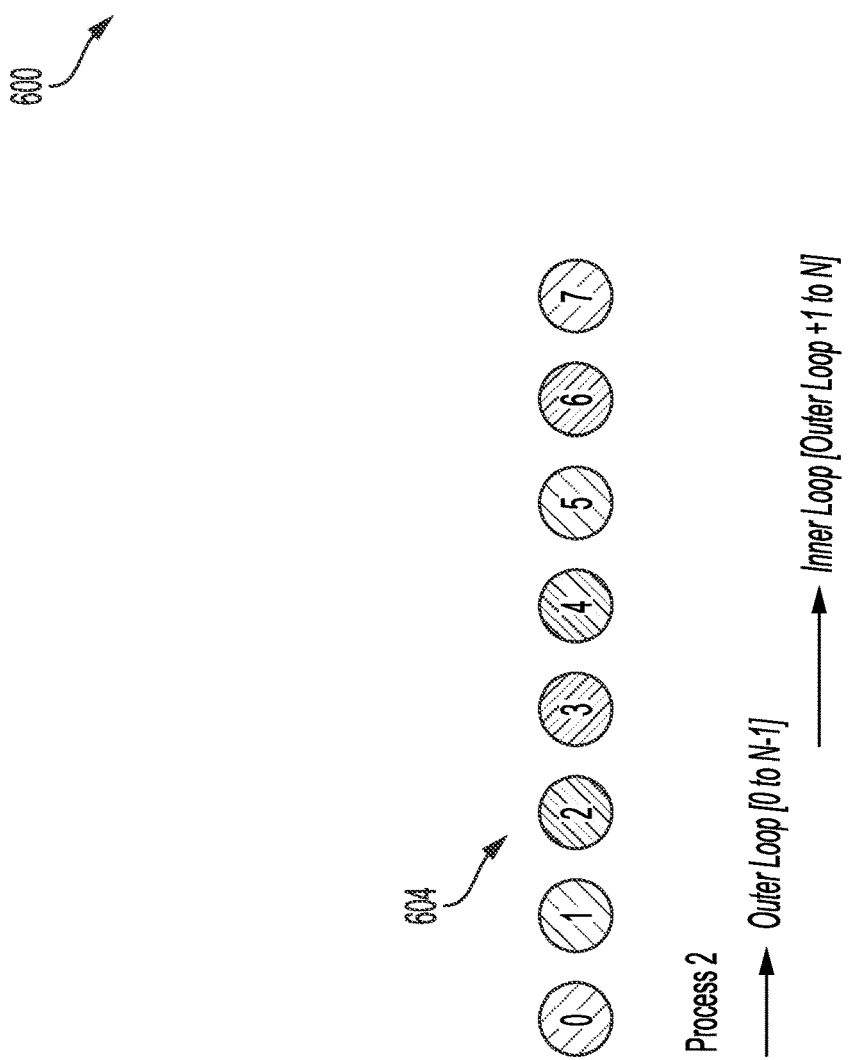

The traversal order output 604 may be further processed to determine whether any of the sub-graphs may be merged. In some aspects, sub-graphs may be merged if the nodes of the sub-graphs to be merged have the same runtime/hardware resource and are independent from each other. In the example of FIGS. 6A-6E, similar cousins (602a, 602b) may be merged if the nodes of the similar cousin 602a are independent from the nodes of the similar cousin 602b. That is, if none of the nodes of similar cousin 602a has a connection to the nodes of similar cousin 602b, then the nodes of the similar cousins (602a, 602b) may be merged. In some aspects, the sub-graphs in the traversal order output 604 may be may be scanned to determine mergeable sub-graphs (e.g., sub-graphs that have the same runtime/hardware resources). As shown in FIG. 6B, the traversal order output 604 may be searched, for example, via a greedy search process via an outer loop (0 to N−1) and inner loop process (+1 to N).

Figure 6C:
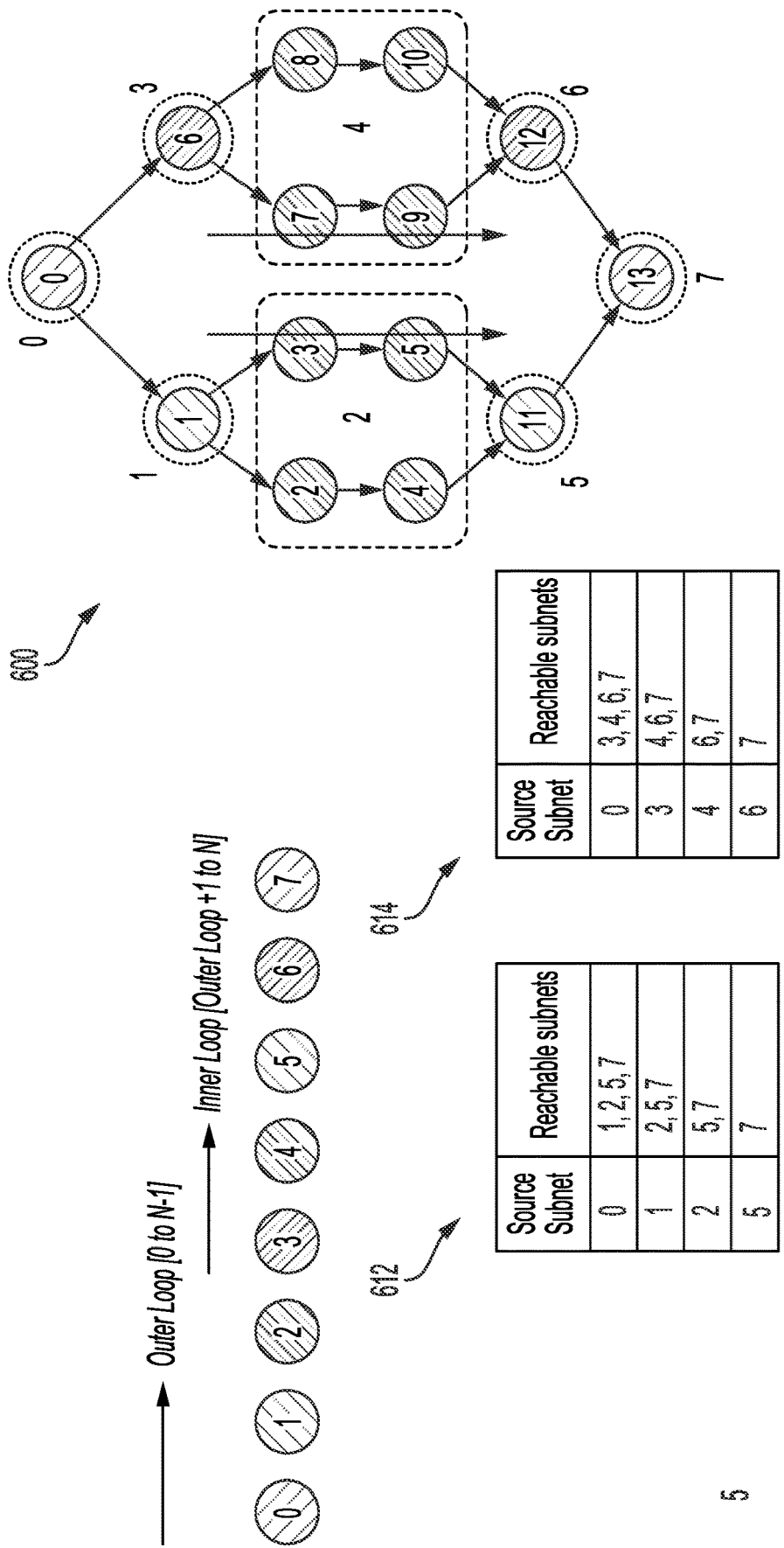

In FIG. 6C, using the outer loop and inner loop process, lists 612 and 614 may be generated indicating the reachable sub-graphs (e.g., whether there is a path that connects the sub-graphs being considered). In the outer loop and inner loop process, all nodes having a similar runtime/hardware resource may be evaluated to determine if nodes are mergeable. For example, the outer loop includes sub-graphs 0-6 and the inner loop includes sub-graphs 1-7. Then, when an outer loop pointer is 0 indicating sub-graph 0, an inner loop pointer may be 1 indicating sub-graph 1. As such, an evaluation of whether sub-graph 0 may be merged with sub-graph 1. Because sub-graph 0 has a different runtime/hardware resource than sub-graph 1, sub-graph 0 may not be merged with sub-graph 1. The inner loop point may be incremented, and an evaluation of whether sub-graph 0 may be merged with sub-graph 2. Because sub-graph 0 has a different runtime/hardware resource than sub-graph 2, sub-graph 0 may not be merged with sub-graph 2. The outer loop and inner loop process may continue evaluating sub-graph in this manner until all sub-graphs have been considered for merging. When the outer loop pointer is at 0 and the inner loop pointer is at 7, an evaluation of whether sub-graph 0 may be merged with sub-graph 7. Because sub-graph 0 and sub-graph 7 have the same runtime/hardware resource, these sub-graphs are further evaluated to determine if the sub-graphs are independent. The sub-graphs are independent if there is no path between the sub-graphs. In this example, because there is a path between the sub-graphs (e.g., sub-graph 7 is reachable from subgraph 7 via sub-graphs 1→2→5 and via sub graphs 3→4→6). In some aspects, a depth first search (DFS) may be performed to determine whether there are paths between two sub-graphs.

Figure 6D:
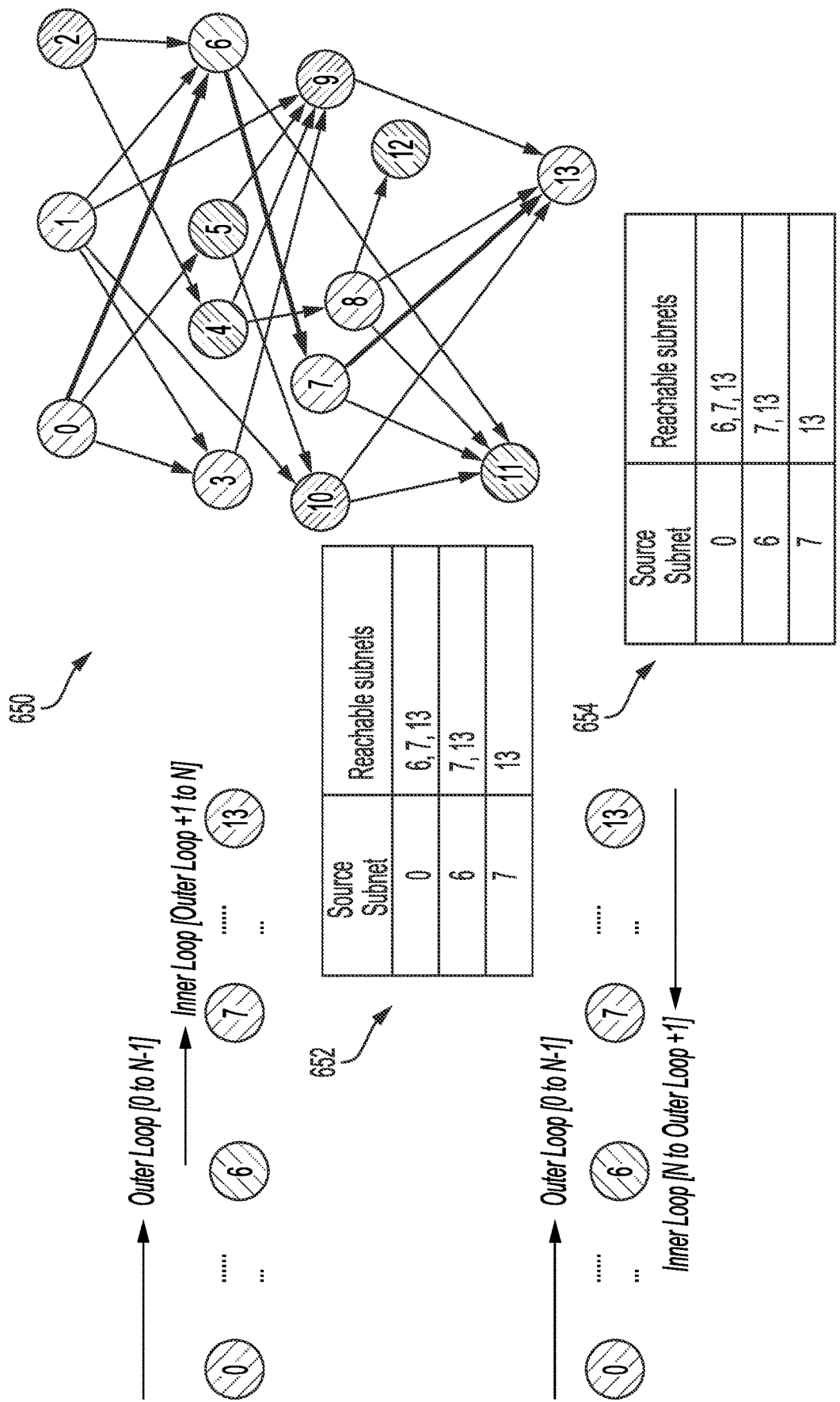
Figure 6E:
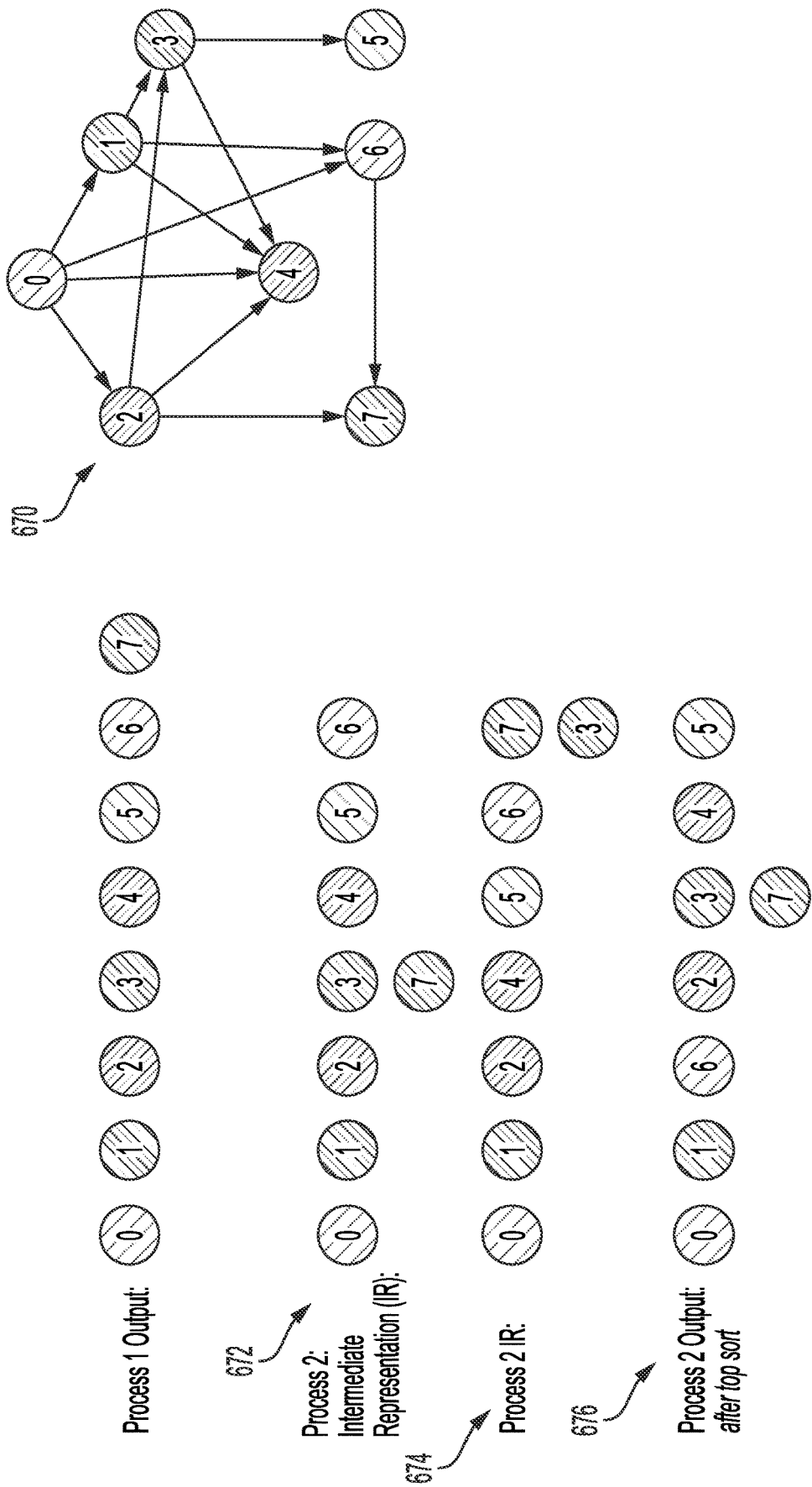

FIGS. 6D and 6E illustrate example graphs 650 and 670, respectively. As shown in FIGS. 6D and 6E, modifying the order or direction of processing the outer loop and inner loop process may improve the partitioning of graphs. Referring to FIG. 6D, the direction of processing the inner loop may be reversed. That is, rather than processing the inner loop in the same direction as the outer loop (both incrementing), the inner loop may begin at the Nth element in the traversal order output and decrement from N to outer loop +1. The reachable sub-graphs (and therefore dependent) produced when the inner loop and outer loop are aligned or opposite remains the same as indicated in listings 652 and 654, respectively. However, when the outer loop and the inner loop are opposite, one or more of the reachable sub-graphs that would be determined in a later evaluation may be determined as a consequence of an earlier evaluation. For example, using the opposite loop arrangement, initially the outer loop pointer is 0 and the inner loop pointer is 13, such that an evaluation is conducted to determine whether sub-graph 0 may be merged with sub-graph 13. As shown in graph 650, sub-graph 13 is reachable from sub-graph 0 via the path 6→7→13. As such, sub-graph 13 is not independent from sub-graph 0, and sub-graph 13 may not be merged with sub-graph 0. However, because of this initial iteration of the opposite aligned outer loop and inner loop, it is also known that sub-graph 6 may not be merged with sub-graph 7 or sub-graph 13. It is also known that sub-graph 7 may not be merged with sub-graph 13. In some aspects, the listing of reachable sub-graphs learned in advance (via a prior evaluation) may be cached to reduce the time for partitioning the graph 650 and improve performance.

In some aspects, a DFS may be applied from the perspective of the output of the layer to determine the order of processing nodes in each layer to determine intermediate representations. For example, as shown in FIG. 6E, if the process is conducted left to right, then intermediate representation 1 (672) may be produced. On the other hand, if the process is conducted using the opposite loop arrangement, then intermediate representation 2 (674) may be produced. Accordingly, in some aspects, a top sort may also be performed to generate the traversal order output 676.

Figure 7:
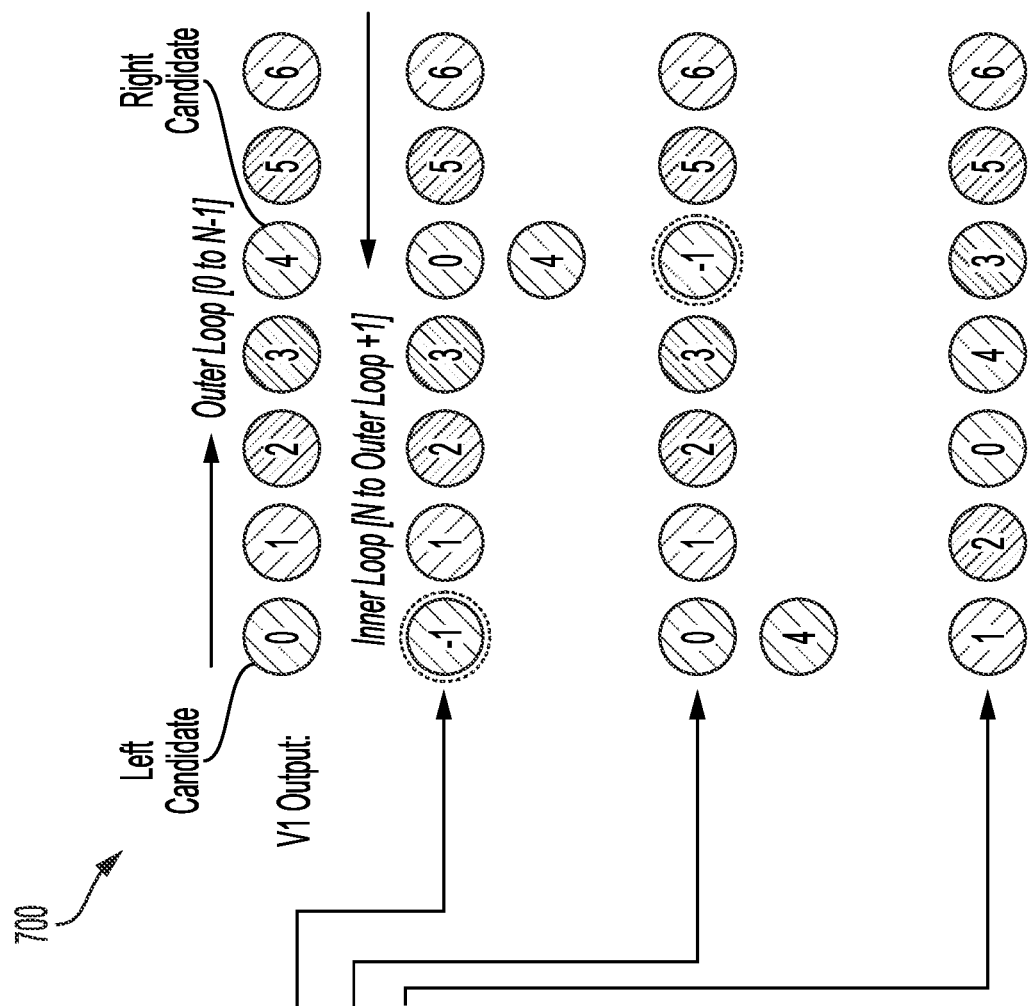
FIG. 7 is a diagram illustrating an example process for further partitioning a graph, in accordance with aspects of the present disclosure.

FIG. 7 is a diagram illustrating an example process for further partitioning a graph 700, in accordance with aspects of the present disclosure. As shown in FIG. 7, the determined traversal order processing described with reference to FIGS. 5A-F and 6A-E may be further improved by determining whether certain sub-graphs (or nodes) may be hopped in the order of processing sub-graphs (or nodes). For instance, an iterative DFS may be performed to determine if a path exists between two sub-graphs to determine whether or not a hop in the order of processing sub-graphs (or nodes) is possible. Each of the sub-graphs having similar runtime/ hardware resource may be considered as hop candidates. In some aspect, the outer loop and inner loop process similar to those described with reference to FIGS. 6A-E may be used for determining a left candidate and a right hop candidate. A hop candidate may hop an adjacent sub-graph in the traversal order output if it is independent of the adjacent sub-graph (if there is no path between the hop candidate and the adjacent sub-graph in the traversal order output). Accordingly, the left candidate may hop adjacent sub-graphs to be adjacent to the right candidate. In some aspects, the right candidate may hops adjacent sub-graphs to adjacent to left candidate. Additionally, in some aspects, both the left and right candidates may move towards each other to be adjacent to each other.

As indicated above, FIGS. 1-7 are provided as examples. Other examples may differ from what is described with respect to FIGS. 1-7.

Figure 8:
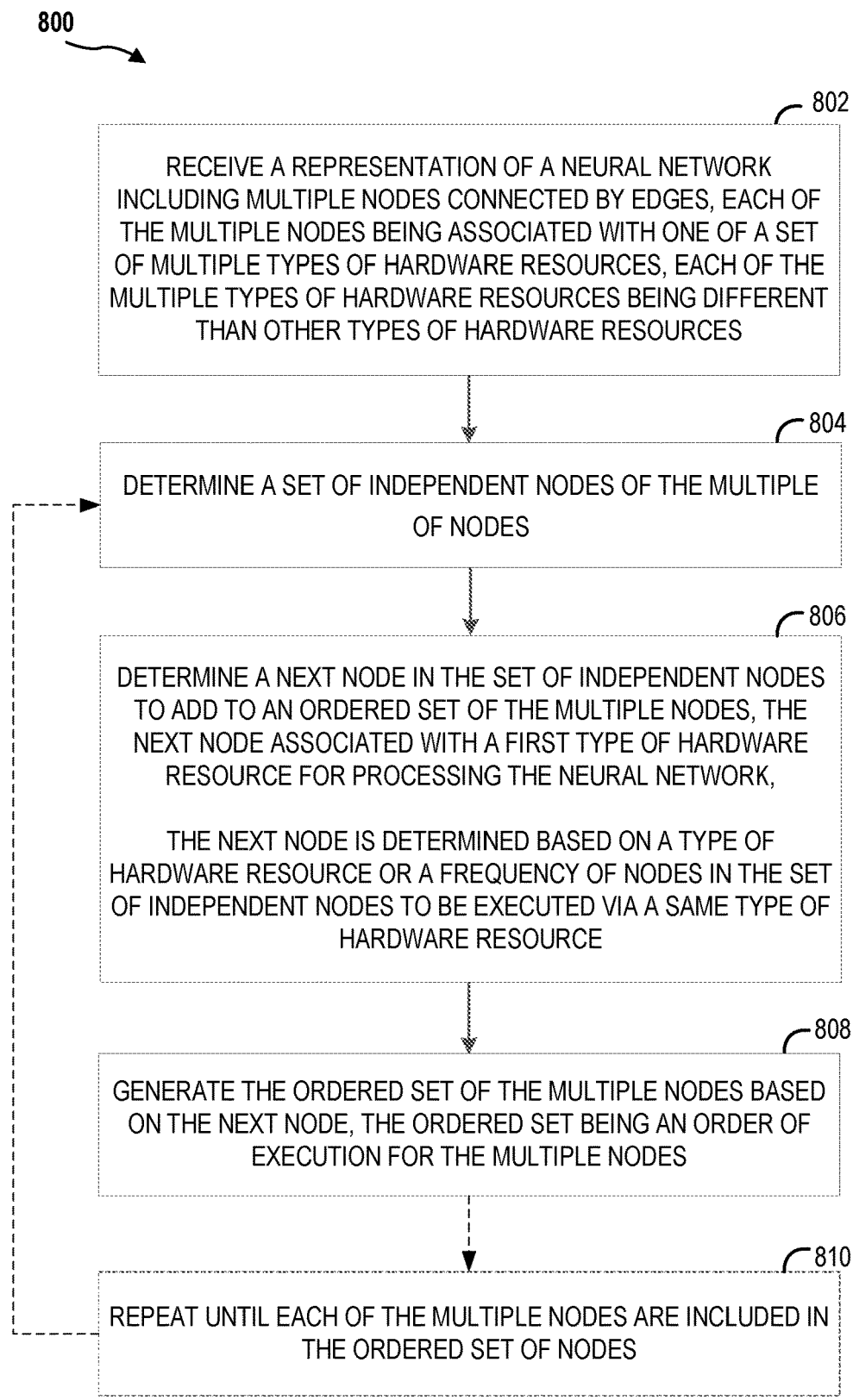
FIG. 8 is a flow diagram illustrating a method for processing a neural network, according to aspects of the present disclosure.

FIG. 8 is a flow diagram illustrating a method 800 for processing a neural network, according to aspects of the present disclosure. In block 802, the method 800 receives a representation of the neural network including multiple nodes connected by edges, each of the multiple nodes being associated with one of a set of multiple types of hardware resources, each of the multiple types of hardware resources being different than other types of hardware resources.

At block 804, the method 800 determines a set of independent nodes of the multiple of nodes. Each node may include one or more operations to be performed by a hardware resource of the neural network. For example, as described with reference to FIGS. 5A-F, nodes of graph 500 may be added be added to the free set 502 if the node has no incoming connections. In the example of FIG. 5A, node A is added to the free set 502 because node A has no incoming edges or connections.

In some aspects, the hardware resource may be the central processing unit (CPU) 102, the graphics processing unit (GPU) 104, or the digital signal processor (DSP) 106 of FIG. 1, or a hardware accelerator.

At block 806, the method 800 determines a next node in the set of independent nodes to add to an ordered set of the multiple nodes, the next node associated with a first type of hardware resource for processing the neural network. The next node is determined based on a type of hardware resource or a frequency of nodes in the set of independent nodes to be executed via a same type of hardware resource. For example, as described with reference to FIGS. 5A-F, a next node may be selected for addition to the traversal order set 504 if it has the same runtime or is processed on the same hardware resource (e.g., CPU, GPU, NPU, DSP, or AIP) as may be indicated with the same shading.

At block 808, the method 800 generates the ordered set of the multiple nodes based on the next node, the ordered set being an order of execution for the multiple nodes. For example, as described with reference to FIGS. 5A-F, node N is added to the traversal order set 504 to generate an order for executing nodes of the graph 500. At block 810, the method 800 may return to block 804 and may repeat until each of the multiple nodes is included in the ordered set of nodes.

In some aspects, the method 800 may be performed by the SOC 100 (FIG. 1). That is, each of the elements of the method 800 may, for example, but without limitation, be performed by the SOC 100 or one or more processors (e.g., CPU 102) and/or other components included therein.

Implementation examples are provided in the following numbered clauses.

1. A method for processing a neural network, comprising:
   receiving a representation of the neural network including a plurality of nodes connected by edges, each of the plurality of nodes being associated with one of a set of multiple types of hardware resources, each of the multiple types of hardware resources being different than other types of hardware resources;

determining a set of independent nodes of the plurality of nodes;

determining a next node in the set of independent nodes to add to an ordered set of the plurality of nodes, the next node associated with a first type of hardware resource for processing the neural network, the next node determined based on a type of hardware resource or a frequency of nodes in the set of independent nodes to be executed via a same type of hardware resource; and generating the ordered set of the plurality of nodes based on the next node, the ordered set being an order of execution for the plurality of nodes.

2. The method of clause 1, further comprising repeating the determining the set of independent nodes, the determining the next node, and the generating until each of the plurality of nodes are included in the ordered set of the plurality of nodes.

3. The method of any of clauses 1-2, in which the hardware resource is a central processing unit (CPU), a graphics processing unit (GPU), a digital signal processor (DSP), or a hardware accelerator.

4. The method of any of clauses 1-3, further comprising updating an order of nodes in the ordered set by performing a depth first search of the ordered set of the plurality of nodes.

5. The method of any of clauses 1-4, in which the depth first search includes:
selecting a first node of the ordered set and a second node of the ordered set; and
determining whether the first node and the second node are mergeable into a subgroup, in which the first node and the second node are mergeable if the first node is independent of the second node.

6. The method of any of clauses 1-5, further comprising:
caching a result of the depth first search;
determining a redundant search; and
skipping execution of the redundant search.

7. The method of any of clauses 1-6, in which the depth first search is conducted such that an order of searching for mergeable nodes in the ordered set is reversed.

8. The method of any of clauses 1-7, further comprising:
selecting a first node of the ordered set and a second node of the ordered set;
hopping the first node over one or more succeeding nodes in the ordered set of the plurality of nodes between the first node and the second node if there is no execution path between the first node and each of the one or more succeeding nodes in the ordered set;
repeating the hopping until the first node is unable to hop over a succeeding node of the one or more succeeding nodes;
evaluating whether the first node is adjacent to the second node after the hopping and the repeating; and
merging the first node and the second node if they are adjacent in the ordered set of the plurality of nodes.

9. The method of any of clauses 1-8, further comprising performing a depth first search to determine whether the execution path exists between the first node and the one or more succeeding nodes between the first node and the second node in the ordered set of the plurality of nodes.

10. The method of any of clauses 1-9, further comprising:
selecting a first node of the ordered set and a second node of the ordered set;
hopping the second node over one or more preceding nodes in the ordered set of the plurality of nodes between the first node and the second node if there is no execution path between the second node and each of the one or more preceding nodes in the ordered set;
repeating the hopping until the second node is unable to hop over a preceding node of the one or more preceding nodes;
evaluating whether the first node is adjacent to the second node after the hopping and the repeating; and
merging the first node and the second node if they are adjacent in the ordered set of the plurality of nodes.

11. The method of any of clauses 1-10, further comprising performing a depth first search to determine whether the execution path exists between the second node and the one or more preceding nodes between the first node and the second node in the ordered set of the plurality of nodes.

12. The method of any of clauses 1-11, further comprising:
selecting a first node of the ordered set and a second node of the ordered set;
hopping the first node over one or more succeeding nodes in the ordered set of the plurality of nodes if there is no first execution path between the first node and each of the one or more succeeding nodes in the ordered set;
hopping the second node over one or more preceding nodes in the ordered set of the plurality of nodes between the first node and the second node if there is no second execution path between the second node and each of the one or more preceding nodes in the ordered set;
repeating the hopping of the first node until the first node is unable to hop over a succeeding node of the one or more succeeding nodes and repeating the hopping of the second node until the second node is unable to hop over a preceding node of the one or more preceding nodes;
evaluating whether the first node is adjacent to the second node; and
merging the first node and the second node if they are adjacent in the ordered set of the plurality of nodes.

13. The method of any of clauses 1-12, further comprising performing a depth first search to determine whether the first execution path or the second execution path exists.

14. An apparatus for processing a neural network, comprising:
a memory; and
at least one processor coupled to the memory, the at least one processor being configured:
to receive a representation of the neural network including a plurality of nodes connected by edges, each of the plurality of nodes being associated with one of a set of multiple types of hardware resources, each of the multiple types of hardware resources being different than other types of hardware resources;
to determine a set of independent nodes of the plurality of nodes;
to determine a next node in the set of independent nodes to add to an ordered set of the plurality of nodes, the next node associated with a first type of hardware resource for processing the neural network, the next node determined based on a type of hardware resource or a frequency of nodes in the set of independent nodes to be executed via a same type of hardware resource; and to generate the ordered set of the plurality of nodes based on the next node, the ordered set being an order of execution for the plurality of nodes.

15. The apparatus of clause 14, in which the at least one processor is further configured to repeat the determining the set of independent nodes, the determining the next node, and the generating until each of the plurality of nodes are included in the ordered set of the plurality of nodes.

16. The apparatus of any of clauses 14-15, in which the hardware resource is a central processing unit (CPU), a graphics processing unit (GPU), a digital signal processor (DSP), or a hardware accelerator.

17. The apparatus of any of clauses 14-16, in which the at least one processor is further configured to update an order of nodes in the ordered set by performing a depth first search of the ordered set of the plurality of nodes.

18. The apparatus of any of clauses 14-17 in which the at least one processor is further configured to perform a depth first search of the ordered set by:

selecting a first node of the ordered set and a second node of the ordered set; and determining whether the first node and the second node are mergeable into a subgroup, in which the first node and the second node are mergeable if the first node is independent of the second node.

19. The apparatus of any of clauses 14-18, in which the at least one processor is further configured:

to cache a result of the depth first search;

to determine a redundant search; and to skip execution of the redundant search.

20. The apparatus of any of clauses 14-19, in which the at least one processor is further configured to conduct the depth first search such that an order of searching for mergeable nodes in the ordered set is reversed.

21. The apparatus of any of clauses 14-20, in which the at least one processor is further configured:

to select a first node of the ordered set and a second node of the ordered set;

to hop the first node over one or more succeeding nodes in the ordered set of the plurality of nodes between the first node and the second node if there is no execution path between the first node and each of the one or more succeeding nodes in the ordered set;

to repeat the hopping until the first node is unable to hop over a succeeding node of the one or more succeeding nodes;

to evaluate whether the first node is adjacent to the second node after the hopping and the repeating; and to merge the first node and the second node if they are adjacent in the ordered set of the plurality of nodes.

22. The apparatus of any of clauses 14-21, in which the at least one processor is further configured to perform a depth first search to determine whether the execution path exists between the first node and the one or more succeeding nodes between the first node and the second node in the ordered set of the plurality of nodes.

23. The apparatus of any of clauses 14-22, in which the at least one processor is further configured:

to select a first node of the ordered set and a second node of the ordered set;

to hop the second node over one or more preceding nodes in the ordered set of the plurality of nodes between the first node and the second node if there is no execution path between the second node and each of the one or more preceding nodes in the ordered set;

to repeat the hopping until the second node is unable to hop over a preceding node of the one or more preceding nodes;

to evaluate whether the first node is adjacent to the second node after the hopping and the repeating; and to merge the first node and the second node if they are adjacent in the ordered set of the plurality of nodes.

24. The apparatus of any of clauses 14-23, in which the at least one processor is further configured to performing a depth first search to determine whether the execution path exists between the second node and the one or more preceding nodes between the first node and the second node in the ordered set of the plurality of nodes.

25. The apparatus of any of clauses 14-24, in which the at least one processor is further configured:

to select a first node of the ordered set and a second node of the ordered set;

to hop the first node over one or more succeeding nodes in the ordered set of the plurality of nodes if there is no first execution path between the first node and each of the one or more succeeding nodes in the ordered set;

to hop the second node over one or more preceding nodes in the ordered set of the plurality of nodes between the first node and the second node if there is no second execution path between the second node and each of the one or more preceding nodes in the ordered set;

to repeat the hopping of the first node until the first node is unable to hop over a succeeding node of the one or more succeeding nodes and repeating the hopping of the second node until the second node is unable to hop over a preceding node of the one or more preceding nodes;

to evaluate whether the first node is adjacent to the second node; and to merge the first node and the second node if they are adjacent in the ordered set of the plurality of nodes.

26. The apparatus of any of clauses 14-25, in which the at least one processor is further configured to perform a depth first search to determine whether the first execution path or the second execution path exists.

27. An apparatus for processing a neural network, comprising:

means for receiving a representation of the neural network including a plurality of nodes connected by edges, each of the plurality of nodes being associated with one of a set of multiple types of hardware resources, each of the multiple types of hardware resources being different than other types of hardware resources;

means for determining a set of independent nodes of the plurality of nodes;

means for determining a next node in the set of independent nodes to add to an ordered set of the plurality of nodes, the next node associated with a first type of hardware resource for processing the neural network, the next node determined based on a type of hardware resource or a frequency of nodes in the set of independent nodes to be executed via a same type of hardware resource; and means for generating the ordered set of the plurality of nodes based on the next node, the ordered set being an order of execution for the plurality of nodes.

28. The apparatus of clause 27, further comprising means for repeating the determining the set of independent nodes, the determining the next node, and the generating until each of the plurality of nodes are included in the ordered set of the plurality of nodes.

29. A non-transitory computer readable medium having encoded thereon program code for processing a neural network, the program code being executed by a processor and comprising:

program code to receiving a representation of the neural network including a plurality of nodes connected by edges, each of the plurality of nodes being associated with one of a set of multiple types of hardware resources, each of the multiple types of hardware resources being different than other types of hardware resources;

program code to determine a set of independent nodes of the plurality of nodes;

program code to determine a next node in the set of independent nodes to add to an ordered set of the plurality of nodes, the next node associated with a first type of hardware resource for processing the neural network, the next node determined based on a type of hardware resource or a frequency of nodes in the set of independent nodes to be executed via a same type of hardware resource; and program code to generate the ordered set of the plurality of nodes based on the next node, the ordered set being an order of execution for the plurality of nodes.

30. The non-transitory computer readable medium of clause 29 further comprising program code to repeat the determining the set of independent nodes, the determining the next node, and the generating until each of the plurality of nodes are included in the ordered set of the plurality of nodes.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used, include compact disc (CD), laser disc, optical disc, digital versatile disc (DVD), floppy disk, and Blu-ray® disc where disks usually reproduce data magnetically, while discs reproduce data optically with lasers. Thus, in some aspects, computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented. For example, such a computer program product may comprise a computer-readable medium having instructions stored (and/or encoded) thereon, the instructions being executable by one or more processors to perform the operations described. For certain aspects, the computer program product may include packaging material.

Further, it should be appreciated that modules and/or other appropriate means for performing the methods and techniques described can be downloaded and/or otherwise obtained by a user terminal and/or base station as applicable. For example, such a device can be coupled to a server to facilitate the transfer of means for performing the methods described. Alternatively, various methods described can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for processing a neural network, comprising:
receiving a representation of the neural network including a plurality of nodes connected by edges, each of the plurality of nodes being associated with one of a set of multiple types of hardware resources, each of the multiple types of hardware resources being different than other types of hardware resources;
repeatedly determining a set of independent nodes of the plurality of nodes, each independent node having no incoming edges from any node or removed node;
determining a next node in the set of independent nodes to add to an ordered set of the plurality of nodes, the next node associated with a first type of hardware resource for processing the neural network, the next node determined based on a type of hardware resource or a frequency of nodes in the set of independent nodes to be executed via a same type of hardware resource;
removing the next node from the set of independent nodes in response to adding the next node to the ordered set;
generating the ordered set of the plurality of nodes based on the next node, the ordered set being an order of execution for the plurality of nodes; and
executing the ordered set with the multiple types of hardware resources.

2. The method of claim 1, further comprising repeating the determining the set of independent nodes, the determining the next node, and the generating until each of the plurality of nodes are included in the ordered set of the plurality of nodes.

3. The method of claim 1, in which the hardware resource is a central processing unit (CPU), a graphics processing unit (GPU), a digital signal processor (DSP), or a hardware accelerator.

4. The method of claim 1, further comprising updating an order of nodes in the ordered set by performing a depth first search of the ordered set of the plurality of nodes.

5. The method of claim 4, in which the depth first search includes:
selecting a first node of the ordered set and a second node of the ordered set; and
determining whether the first node and the second node are mergeable into a subgroup, in which the first node and the second node are mergeable if the first node is independent of the second node.

6. The method of claim 4, further comprising:
caching a result of the depth first search;
determining a redundant search; and
skipping execution of the redundant search.

7. The method of claim 4, in which the depth first search is conducted such that an order of searching for mergeable nodes in the ordered set is reversed.

8. The method of claim 1, further comprising:
selecting a first node of the ordered set and a second node of the ordered set;
hopping the first node over one or more succeeding nodes in the ordered set of the plurality of nodes between the first node and the second node if there is no execution path between the first node and each of the one or more succeeding nodes in the ordered set;
repeating the hopping until the first node is unable to hop over a succeeding node of the one or more succeeding nodes;
evaluating whether the first node is adjacent to the second node after the hopping and the repeating; and
merging the first node and the second node if they are adjacent in the ordered set of the plurality of nodes.

9. The method of claim 8, further comprising performing a depth first search to determine whether the execution path exists between the first node and the one or more succeeding nodes between the first node and the second node in the ordered set of the plurality of nodes.

10. The method of claim 1, further comprising:
selecting a first node of the ordered set and a second node of the ordered set;
hopping the second node over one or more preceding nodes in the ordered set of the plurality of nodes between the first node and the second node if there is no execution path between the second node and each of the one or more preceding nodes in the ordered set;
repeating the hopping until the second node is unable to hop over a preceding node of the one or more preceding nodes;
evaluating whether the first node is adjacent to the second node after the hopping and the repeating; and
merging the first node and the second node if they are adjacent in the ordered set of the plurality of nodes.

11. The method of claim 10, further comprising performing a depth first search to determine whether the execution path exists between the second node and the one or more preceding nodes between the first node and the second node in the ordered set of the plurality of nodes.

12. The method of claim 1, further comprising:
selecting a first node of the ordered set and a second node of the ordered set;
hopping the first node over one or more succeeding nodes in the ordered set of the plurality of nodes if there is no first execution path between the first node and each of the one or more succeeding nodes in the ordered set;
hopping the second node over one or more preceding nodes in the ordered set of the plurality of nodes between the first node and the second node if there is no second execution path between the second node and each of the one or more preceding nodes in the ordered set;
repeating the hopping of the first node until the first node is unable to hop over a succeeding node of the one or more succeeding nodes and repeating the hopping of the second node until the second node is unable to hop over a preceding node of the one or more preceding nodes;
evaluating whether the first node is adjacent to the second node; and
merging the first node and the second node if they are adjacent in the ordered set of the plurality of nodes.

13. The method of claim 12, further comprising performing a depth first search to determine whether the first execution path or the second execution path exists.

14. An apparatus for processing a neural network, comprising:
at least one memory; and
at least one processor coupled to the at least one memory, the at least one processor being configured:
to receive a representation of the neural network including a plurality of nodes connected by edges, each of the plurality of nodes being associated with one of a set of multiple types of hardware resources, each of the multiple types of hardware resources being different than other types of hardware resources;
to repeatedly determine a set of independent nodes of the plurality of nodes, each independent node having no incoming edges from any node or removed node;

to determine a next node in the set of independent nodes to add to an ordered set of the plurality of nodes, the next node associated with a first type of hardware resource for processing the neural network, the next node determined based on a type of hardware resource or a frequency of nodes in the set of independent nodes to be executed via a same type of hardware resource;

to remove the next node from the set of independent nodes in response to adding the next node to the ordered set;

to generate the ordered set of the plurality of nodes based on the next node, the ordered set being an order of execution for the plurality of nodes; and to execute the ordered set with the multiple types of hardware resources.

15. The apparatus of claim 14, in which the at least one processor is further configured to repeat the determining the set of independent nodes, the determining the next node, and the generating until each of the plurality of nodes are included in the ordered set of the plurality of nodes.

16. The apparatus of claim 14, in which the hardware resource is a central processing unit (CPU), a graphics processing unit (GPU), a digital signal processor (DSP), or a hardware accelerator.

17. The apparatus of claim 14, in which the at least one processor is further configured to update an order of nodes in the ordered set by performing a depth first search of the ordered set of the plurality of nodes.

18. The apparatus of claim 14, in which the at least one processor is further configured to perform a depth first search of the ordered set by:

selecting a first node of the ordered set and a second node of the ordered set; and determining whether the first node and the second node are mergeable into a subgroup, in which the first node and the second node are mergeable if the first node is independent of the second node.

19. The apparatus of claim 18, in which the at least one processor is further configured:

to cache a result of the depth first search;

to determine a redundant search; and to skip execution of the redundant search.

20. The apparatus of claim 18, in which the at least one processor is further configured to conduct the depth first search such that an order of searching for mergeable nodes in the ordered set is reversed.

21. The apparatus of claim 14, in which the at least one processor is further configured:

to select a first node of the ordered set and a second node of the ordered set;

to hop the first node over one or more succeeding nodes in the ordered set of the plurality of nodes between the first node and the second node if there is no execution path between the first node and each of the one or more succeeding nodes in the ordered set;

to repeat the hopping until the first node is unable to hop over a succeeding node of the one or more succeeding nodes;

to evaluate whether the first node is adjacent to the second node after the hopping and the repeating; and to merge the first node and the second node if they are adjacent in the ordered set of the plurality of nodes.

22. The apparatus of claim 21, in which the at least one processor is further configured to perform a depth first search to determine whether the execution path exists between the first node and the one or more succeeding nodes between the first node and the second node in the ordered set of the plurality of nodes.

23. The apparatus of claim 14, in which the at least one processor is further configured:

to select a first node of the ordered set and a second node of the ordered set;

to hop the second node over one or more preceding nodes in the ordered set of the plurality of nodes between the first node and the second node if there is no execution path between the second node and each of the one or more preceding nodes in the ordered set;

to repeat the hopping until the second node is unable to hop over a preceding node of the one or more preceding nodes;

to evaluate whether the first node is adjacent to the second node after the hopping and the repeating; and to merge the first node and the second node if they are adjacent in the ordered set of the plurality of nodes.

24. The apparatus of claim 23, in which the at least one processor is further configured to performing a depth first search to determine whether the execution path exists between the second node and the one or more preceding nodes between the first node and the second node in the ordered set of the plurality of nodes.

25. The apparatus of claim 14, in which the at least one processor is further configured:

to select a first node of the ordered set and a second node of the ordered set;

to hop the first node over one or more succeeding nodes in the ordered set of the plurality of nodes if there is no first execution path between the first node and each of the one or more succeeding nodes in the ordered set;

to hop the second node over one or more preceding nodes in the ordered set of the plurality of nodes between the first node and the second node if there is no second execution path between the second node and each of the one or more preceding nodes in the ordered set;

to repeat the hopping of the first node until the first node is unable to hop over a succeeding node of the one or more succeeding nodes and repeating the hopping of the second node until the second node is unable to hop over a preceding node of the one or more preceding nodes;

to evaluate whether the first node is adjacent to the second node; and to merge the first node and the second node if they are adjacent in the ordered set of the plurality of nodes.

26. The apparatus of claim 25, in which the at least one processor is further configured to perform a depth first search to determine whether the first execution path or the second execution path exists.

27. An apparatus for processing a neural network, comprising:

means for receiving a representation of the neural network including a plurality of nodes connected by edges, each of the plurality of nodes being associated with one of a set of multiple types of hardware resources, each of the multiple types of hardware resources being different than other types of hardware resources;

means for repeatedly determining a set of independent nodes of the plurality of nodes, each independent node having no incoming edges from any node or removed node;

means for determining a next node in the set of independent nodes to add to an ordered set of the plurality of nodes, the next node associated with a first type of hardware resource for processing the neural network, the next node determined based on a type of hardware resource or a frequency of nodes in the set of independent nodes to be executed via a same type of hardware resource;

means for removing the next node from the set of independent nodes in response to adding the next node to the ordered set;

means for generating the ordered set of the plurality of nodes based on the next node, the ordered set being an order of execution for the plurality of nodes; and means for executing the ordered set with the multiple types of hardware resources.

28. The apparatus of claim 27, further comprising means for repeating the determining the set of independent nodes, the determining the next node, and the generating until each of the plurality of nodes are included in the ordered set of the plurality of nodes.

29. A non-transitory computer readable medium having encoded thereon program code for processing a neural network, the program code being executed by at least one processor and comprising:

program code to receiving a representation of the neural network including a plurality of nodes connected by edges, each of the plurality of nodes being associated with one of a set of multiple types of hardware resources, each of the multiple types of hardware resources being different than other types of hardware resources;

program code to repeatedly determine a set of independent nodes of the plurality of nodes, each independent node having no incoming edges from any node or removed node;

program code to determine a next node in the set of independent nodes to add to an ordered set of the plurality of nodes, the next node associated with a first type of hardware resource for processing the neural network, the next node determined based on a type of hardware resource or a frequency of nodes in the set of independent nodes to be executed via a same type of hardware resource;

program code to remove the next node from the set of independent nodes in response to adding the next node to the ordered set;

program code to generate the ordered set of the plurality of nodes based on the next node, the ordered set being an order of execution for the plurality of nodes; and program code to execute the ordered set with the multiple types of hardware resources.

30. The non-transitory computer readable medium of claim 29 further comprising program code to repeat the determining the set of independent nodes, the determining the next node, and the generating until each of the plurality of nodes are included in the ordered set of the plurality of nodes.

* * * * *